United States Patent
Yamada

(10) Patent No.: US 12,056,449 B2
(45) Date of Patent: Aug. 6, 2024

(54) DATA MANAGEMENT SYSTEM, TERMINAL DEVICE, AND DATA INPUT METHOD FOR CREATING AND TRANSMITTING A TEMPLATE INCLUDING A PLURALITY OF TASKS FOR DISPLAY AND MANAGEMENT

(71) Applicant: Kazuhiro Yamada, Kanagawa (JP)

(72) Inventor: Kazuhiro Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 287 days.

(21) Appl. No.: 17/448,233

(22) Filed: Sep. 21, 2021

(65) Prior Publication Data
US 2022/0121810 A1    Apr. 21, 2022

(30) Foreign Application Priority Data
Oct. 20, 2020    (JP) .................................. 2020-176229

(51) Int. Cl.
*G06F 3/0482*    (2013.01)
*G06F 40/186*    (2020.01)
(Continued)

(52) U.S. Cl.
CPC .......... *G06F 40/186* (2020.01); *G06F 3/0482* (2013.01); *G06Q 10/06316* (2013.01); *H04N 1/00233* (2013.01)

(58) Field of Classification Search
CPC ................ G06F 40/186; G06F 3/0482; G06Q 10/06316; H04N 1/00233
See application file for complete search history.

(56) References Cited

U.S. PATENT DOCUMENTS 6,738,746 B1 *  5/2004  Barnard ............. G06Q 10/1097
                                                705/7.17
7,945,470 B1 *  5/2011  Cohen .................... G06F 16/27
                                                455/433
(Continued)

FOREIGN PATENT DOCUMENTS

JP        2000-306031        11/2000
JP        2004-199156         7/2004
(Continued)

OTHER PUBLICATIONS

Machine Translation of JP 2019-008654 A (Kawai et al.), obtained from Espacenet.com, 17 pages (Year: 2019).*
Japanese Office Action for 2020-176229 mailed on Apr. 25, 2023.

*Primary Examiner* — Dino Kujundzic
(74) *Attorney, Agent, or Firm* — IPUSA, PLLC

(57) ABSTRACT

A data management system, a terminal device, a data input method, and a non-transitory recording medium. The data management system includes one or more terminal devices and an information processing system. The information processing system stores in one or more memories, a template associated with a plurality of tasks including at least a request task and a reporting task, the template having one or more input items set for each task and transmits the template to the one or more terminal devices. Each of the one or more terminal devices displays on a display, the plurality of tasks associated with the template, receives a selection of a task from the plurality of tasks displayed on the display, and displays on the display, the input items associated with the selected task based on the template.

11 Claims, 18 Drawing Sheets

(51) Int. Cl.
*G06Q 10/0631* (2023.01)
*H04N 1/00* (2006.01)

(56) References Cited

U.S. PATENT DOCUMENTS

| | | | | |
|---|---|---|---|---|
| 9,065,951 | B2* | 6/2015 | Hirakata | H04L 67/02 |
| 10,218,582 | B2* | 2/2019 | Cili | G06F 3/0488 |
| 10,930,400 | B2* | 2/2021 | Robbins | G16H 70/20 |
| 2005/0246212 | A1* | 11/2005 | Shedd | G06Q 10/06 |
| | | | | 705/7.12 |
| 2012/0112908 | A1* | 5/2012 | Prykari | H04L 67/55 |
| | | | | 340/540 |
| 2013/0014026 | A1* | 1/2013 | Beringer | G06Q 10/06311 |
| | | | | 715/753 |
| 2015/0082423 | A1 | 3/2015 | Yamada | |
| 2015/0088558 | A1* | 3/2015 | Guyan | G06Q 10/063114 |
| | | | | 705/4 |
| 2015/0169729 | A1* | 6/2015 | Kumano | G06Q 10/06 |
| | | | | 707/738 |
| 2016/0004493 | A1 | 1/2016 | Yamada | |
| 2016/0029369 | A1 | 1/2016 | Yamada | |
| 2016/0155096 | A1* | 6/2016 | Choi | G06Q 10/1097 |
| | | | | 705/7.21 |
| 2016/0162819 | A1* | 6/2016 | Hakman | G06Q 10/0633 |
| | | | | 705/7.27 |
| 2016/0309301 | A1 | 10/2016 | Yamada | |
| 2017/0277371 | A1* | 9/2017 | Anjo | G06F 40/186 |
| 2021/0125123 | A1* | 4/2021 | Subramanian | G06F 3/04815 |

FOREIGN PATENT DOCUMENTS

| | | |
|---|---|---|
| JP | 2004-234562 | 8/2004 |
| JP | 2005-100353 | 4/2005 |
| JP | 2013-258569 | 12/2013 |
| JP | 2015-084209 | 4/2015 |
| JP | 2019-008654 | 1/2019 |
| JP | 2019-144903 | 8/2019 |
| WO | WO 2014/178228 A1 | 11/2014 |

* cited by examiner

FIG. 9

| INPUT ITEM (NAME) | INPUT FORMAT | MANDATORY ITEM | CLEAR AFTER TRANSMISSION |
|---|---|---|---|
| REPORT IMAGE | IMAGE | X | X |
| CATEGORY | SELECTION |  | X |
| LOCATION | SELECTION | X | X |
| DEPARTMENT | SELECTION |  |  |
| REPORTER | USER |  | X |
| REPORT CONTENT | TEXT | X | X |

FIG. 10

| POSTED DATE AND TIME | REPORT IMAGE | CATEGORY | LOCATION | DEPARTMENT | REPORTER | REPORT CONTENT | LOCATION INFORMATION |
|---|---|---|---|---|---|---|---|
| JULY 15, 2020 10:00 |  | POINTED OUT | CLOSE TO MEETING ROOM A | DEPARTMENT A | XXX | EQUIPMENT MOVED OUT OF DESIGNATED AREA | 35.458995,139.388682 |

FIG. 13

| INPUT ITEM (NAME) | INPUT FORMAT | MANDATORY ITEM | CLEAR AFTER TRANSMISSION |
|---|---|---|---|
| REPORT IMAGE | IMAGE | × | × |
| COUNTERMEASURE IMPLEMENTED BY | USER | | |
| COUNTERMEASURE CONTENT | TEXT | × | × |

FIG. 14

| POSTED DATE AND TIME | REPORT IMAGE | CATE-GORY | LOCATION | DEPART-MENT | RE-PORTER | REPORT CONTENT | LOCATION INFORMA-TION | POSTED DATE AND TIME | COUNTER-MEASURE IMAGE | COUNTER-MEASURE IMPLE-MENTED BY | COUNTER-MEASURE CONTENT |
|---|---|---|---|---|---|---|---|---|---|---|---|
| JULY 15, 2020 10:00 | | POINTED OUT | CLOSE TO MEETING ROOM A | DEPART-MENT A | XXX | EQUIPMENT MOVED OUT OF DESIG-NATED AREA | | JULY 16, 2020 10:00 | 35.458995, 139.388682 | ZZZ | RETURNED TO DESIG-NATED AREA |
| JULY 16, 2020 9:00 | | POINTED OUT | WEST CORRIDOR BUILDING A | DEPART-MENT B | YYY | PARTS ARE SCATTERED | | JULY 17, 2020 10:00 | 35.458995, 139.388682 | WWW | REARRANGED |
| | | | | | | | | | | | |
| | | | | | | | | | | | |

DATA MANAGEMENT SYSTEM, TERMINAL DEVICE, AND DATA INPUT METHOD FOR CREATING AND TRANSMITTING A TEMPLATE INCLUDING A PLURALITY OF TASKS FOR DISPLAY AND MANAGEMENT

CROSS-REFERENCE TO RELATED APPLICATIONS

This patent application is based on and claims priority pursuant to 35 U.S.C. § 119(a) to Japanese Patent Application No. 2020-176229, filed on Oct. 20, 2020 in the Japan Patent Office, the entire disclosure of which is hereby incorporated by reference herein.

BACKGROUND

Technical Field

The present disclosure relates to a data management system, a terminal device, a data input method, and a non-transitory recording medium.

Related Art

In companies and local governments, employees are carrying out improvement activities to improve operations such as how to proceed with work at work sites. In the improvement activities, for example, information on the work site is recorded in the form of images, memos, etc., a correction request is made, and an improvement report is made in response to the correction request.

A system is known in which a document including predetermined input items is distributed from a server to a user's terminal, and the user inputs information to the input items, and records on-site information.

SUMMARY

Embodiments of the present disclosure describe a data management system, a terminal device, a data input method, and a non-transitory recording medium. The data management system includes one or more terminal devices and an information processing system. The information processing system stores in one or more memories, a template associated with a plurality of tasks including at least a request task and a reporting task, the template having one or more input items set for each task and transmits the template to the one or more terminal devices. Each of the one or more terminal devices displays on a display, the plurality of tasks associated with the template, receives a selection of a task from the plurality of tasks displayed on the display, and displays on the display, the input items associated with the selected task based on the template.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is an example of a diagram illustrating a correction request template transmitted from the information processing system to the first terminal device.

FIG. 10 is a diagram illustrating an example of data stored in a data storage unit of an information processing system;

FIG. 13 is a diagram illustrating an example of the improvement report template transmitted from the information processing system to the second terminal device.

FIG. 14 is a diagram illustrating an example of data stored in the data storage unit of an information processing system;

Figure 1:
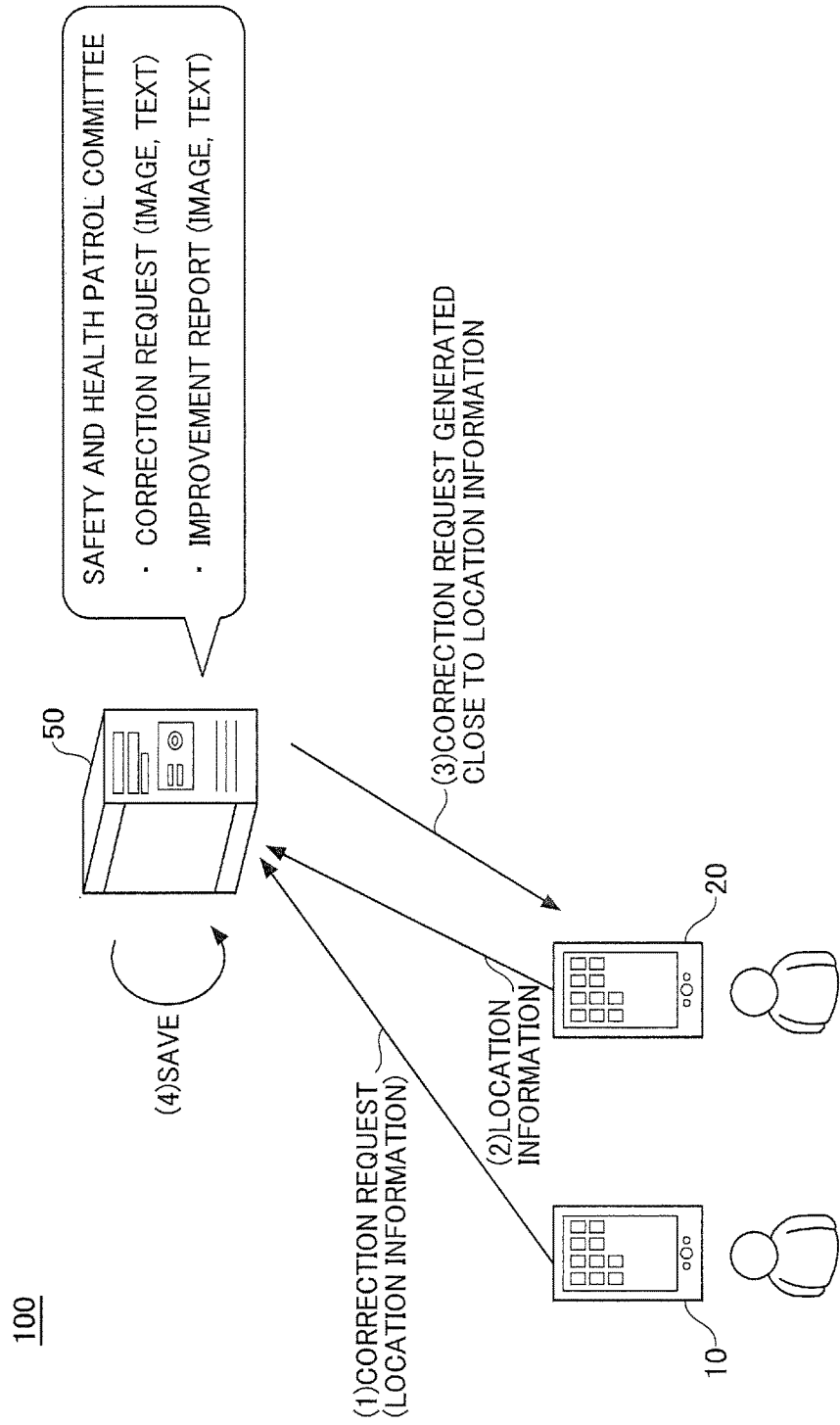
FIG. 1 is a diagram illustrating an outline of operation of a data management system, according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, as an example of embodiments for carrying out the present disclosure, a data management system and a data input method performed by the data management system are described.

For example, when multiple related tasks such as a correction request and an improvement report are included in one safety and health patrol task registration information, the user who inputs data into the correction request in the information processing system and the user who inputs the improvement report in the information processing system are different. It was not easy for each user to display the input items corresponding to the tasks to be input.

In addition, when the administrator intends to respond to the correction request and reports the improvement, it was not easy for the administrator to identify the correction request having been responded from correction requests in the information processing system. In addition, it may be difficult for the safety and health patrol committee member to confirm whether the improvement report has been completed in response to the correction request.

Further, even in a system that links separate tasks of "correction request" and "improvement report", the administrator, etc. must identify at least the correction request corresponding to the improvement report in order to link the data of the two tasks. In the case of a system in which the administrator reports (input data) from a smartphone, the corresponding correction request must be identified on the smartphone. When many correction requests are stored in the system, the administrator has a disadvantage that it takes time to select the desired correction request, and the usability is deteriorated.

In the present embodiment, the information processing system manages a plurality of tasks in association with each other and provides the user's terminal device with input items corresponding to the tasks selected by the user.

FIG. 1 is a diagram illustrating an outline of operation of the data management system 100. First, in the information processing system 50, a plurality of tasks are registered in the task registration information called safety and health patrol. In FIG. 1, the correction request (an example of the first task) and the improvement report (an example of the second task) are set as tasks. The safety and health patrol committee member can add tasks, and items to be entered by the safety and health patrol committee member and the administrator can be added for each task. The tasks that can be added are not limited to tasks such as the correction request and the improvement report, but other tasks such as confirmation and approval may be added.

In FIG. 1, "image" and "text" are set as input items for the correction request and the improvement report. Since multiple tasks are set in the task registration information, when the terminal device application requests the information processing system to perform safety and health patrol tasks, the terminal device application displays a button corresponding to the safety and health patrol tasks. When the safety and health patrol committee member or the administrator selects a task, the terminal device application displays the input items corresponding to the task. Safety and health patrol committee members and administrators can enter data to the input items to complete the task.

(1) The data input to the input items of the correction request by the safety and health patrol committee member using the first terminal device 10 such as a smartphone, is transmitted to the information processing system 50. The first terminal device 10 transmits the input data in association with the location information (an example of first location information).

(2) In response to the administrator inputting data to the input items of the improvement report using the second terminal device 20 and the second terminal device 20 transmitting the data to the information processing system 50, the current location information (an example of second location information) is transmitted to the information processing system 50.

(3) The information processing system 50 transmits the correction request to which the location information close to the current location information is associated as a candidate to the second terminal device 20.

(4) The second terminal device 20 displays a list of one or more correction requests and receives a selection from the administrator. The information processing system 50 stores the data input to the input items of the improvement report in association with the correction request selected by the administrator.

As described above, the information processing system 50 sets a plurality of tasks in one piece of the task registration information. The application displays one or more buttons corresponding to each of the plurality of tasks set in the piece of the task registration information. The safety and health patrol committee members, administrators, etc. can select one or more buttons according to the task to request display of input items according to the task.

Further, since the information processing system 50 stores the data input to a template together with the location information, it is possible to provide a list of correction requests based on the location information of the second terminal device 20 operated by the administrator. The usability of the administrator who generates improvement report in response to the correction request at the site is improved. Further, since the information processing system 50 can manage the data input by different users for different tasks in association with each other, it is easy for the safety and health patrol committee member to confirm whether the improvement report has been completed in response to the correction request.

The safety and health patrol committee member is a person who requests correction, and the administrator is a person who reports improvement. The safety and health patrol committee member also manages correction requests and improvement reports and manages whether improvement reports are completed for all correction requests. The user includes the safety and health patrol committee member and the administrator. The safety and health patrol committee member and the administrator may be the same person.

The task refers to the work and scope of work that a person must perform. The task is sometimes called work, job, mission, office work, work to be done (to do), request, etc.

The request is a work in which one user asks another user to execute, and the report is a work in which information on a result of another user implementing countermeasures for the request work is recorded and transmitted. In the present embodiment, the correction request is an example of the request, and the improvement report is an example of the report.

The input item is an input frame displayed on the screen by the terminal device for the user to input information. Entering information involves selecting one or more of a plurality of options. The shape of the item, presence or absence of a frame, input method (key type, voice, copy paste, barcode imaging), etc. are not limited. Moreover, an initial value may be displayed.

The template is one or more data input items prepared for each task. The report can be completed when the user inputs data in each input item of the template.

Tasks are associated when a plurality of tasks related to each other are specified, for example, when the task registration information is specified. Alternatively, when a task is specified, remaining tasks are specified.

The plurality of tasks may have a temporal order such as a relationship between a request and a response or may be tasks that can be executed by the user in any order.

The task registration information is information in which a plurality of related tasks are associated and registered for a certain task. In the present embodiment, an example of the task is a safety and health patrol, and the correction request and the improvement report are associated with each other by the task registration information.

Figure 2:
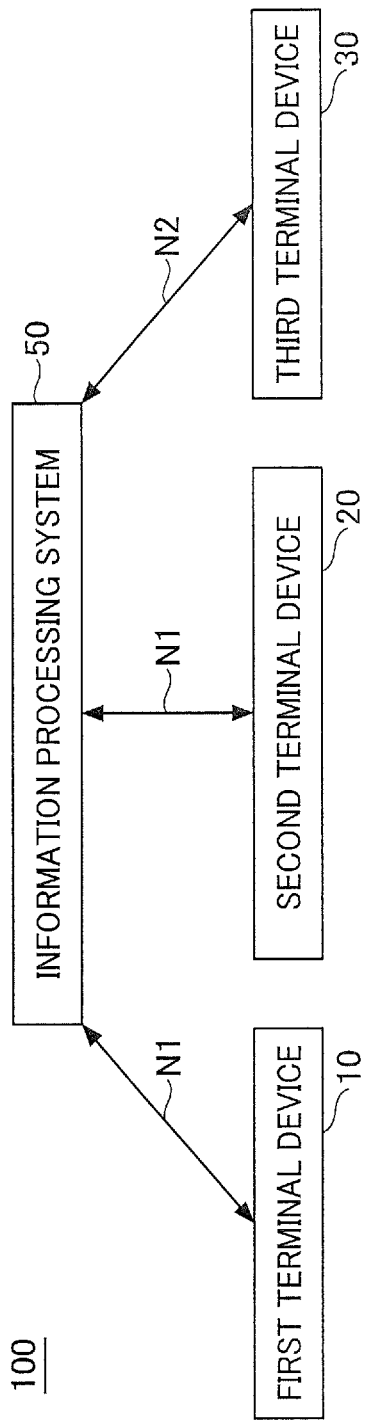
FIG. 2 is a block diagram illustrating an example of a configuration of the data management system.

FIG. 2 is a block diagram illustrating an example of a system configuration of the data management system 100. The data management system 100 of FIG. 2 includes an information processing system 50 capable of communicating with the first terminal device 10, the second terminal device 20, and a third terminal device 30.

Any one of the first terminal device 10 and the second terminal device 20 communicates with the information processing system 50 through a network N1. The network N1 of the present embodiment is a network using public lines such as third generation (3G), fourth generation (4G), fifth generation (5G), and Long Term Evolution (LTE). A public line is a communication line connecting bases that is used by unspecified users by sharing the same physical line. For example, a mobile phone network and a Personal Handy-phone System (PHS) communication network can be mentioned. Any one of the first terminal device 10 or the second terminal device 20 can be connected to an access point through a wireless local area network (LAN) such as Wi-Fi and can communicate with the information processing system 50 through the internet or by wire.

The third terminal device 30 and the information processing system 50 communicate with each other through the network N2. The network N2 of the present embodiment is assumed to be the LAN implemented in a facility where the third terminal device 30 or the information processing system 50 is installed, a wide area network (WAN) including a plurality of LANs, the internet, and the like. It suffices if the third terminal device 30 and the information processing system 50 can communicate with each other. The network N2 is any one of a wired network, a wireless network, and a combination of the wired network and the wireless network. Further, the third terminal device 30 may connect to a public line and communicate with the information processing system 50.

The first terminal device 10 and the second terminal device 20 each is implemented by a computer, which is installed with a web browser or an application. Any one of the web browser or the application is provided with a function of storing data according to the task in the information processing system 50 and downloading and displaying the data according to the task managed by the information processing system 50. The user may edit or delete the data by using the web browser or the application. In any one of the first terminal device 10 or the second terminal device 20, a general application such as an application for allowing the user to take a photograph also operates in addition to the web browser or application.

Examples of the first terminal device 10 and the second terminal device 20 include, but is not limited to, a smartphone, a mobile phone, a tablet terminal, a game machine, a personal digital assistant (PDA), a digital camera, a wearable personal computer (PC), a PC, and a game machine.

The information processing system 50 is, for example, one or more information processing apparatuses on the internet. The information processing system 50 on the network may be referred to as a server. The server is a computer that operates according to software to provide information and processing results in response to a request from a client.

The third terminal device 30 is implemented by the computer, installed with the web browser or the application. Any one of the web browser and application includes a function of downloading and displaying the data stored in the information processing system 50. Specifically, the third terminal device 30 is the PC, the tablet terminal, or the like.

The information processing system 50 accumulates data related to the task transmitted from the first terminal device 10 and the second terminal device 20, and in response to a request from the first terminal device 10 and the second terminal device 20, transmits the data to the first terminal device 10 and the second terminal device 20. The information processing system 50 may reside on the internet or may reside on-premises. When the information processing system 50 resides on the internet, the information processing system 50 desirably supports cloud computing. Cloud is a term used when a particular hardware resource is not intended. The information processing system 50 may be called a cloud system, a server system, or the like.

The information processing system 50 incudes a storage area for storing data related to the task. The storage area may be used by a service that provides users with disk space on the internet. The information processing system 50 may be called an online storage. The information processing system 50 may be used by both general users and companies. In the case of a company, it is not necessary to build a file server environment in-house, and the capacity can be increased or decreased as necessary.

Figure 3:
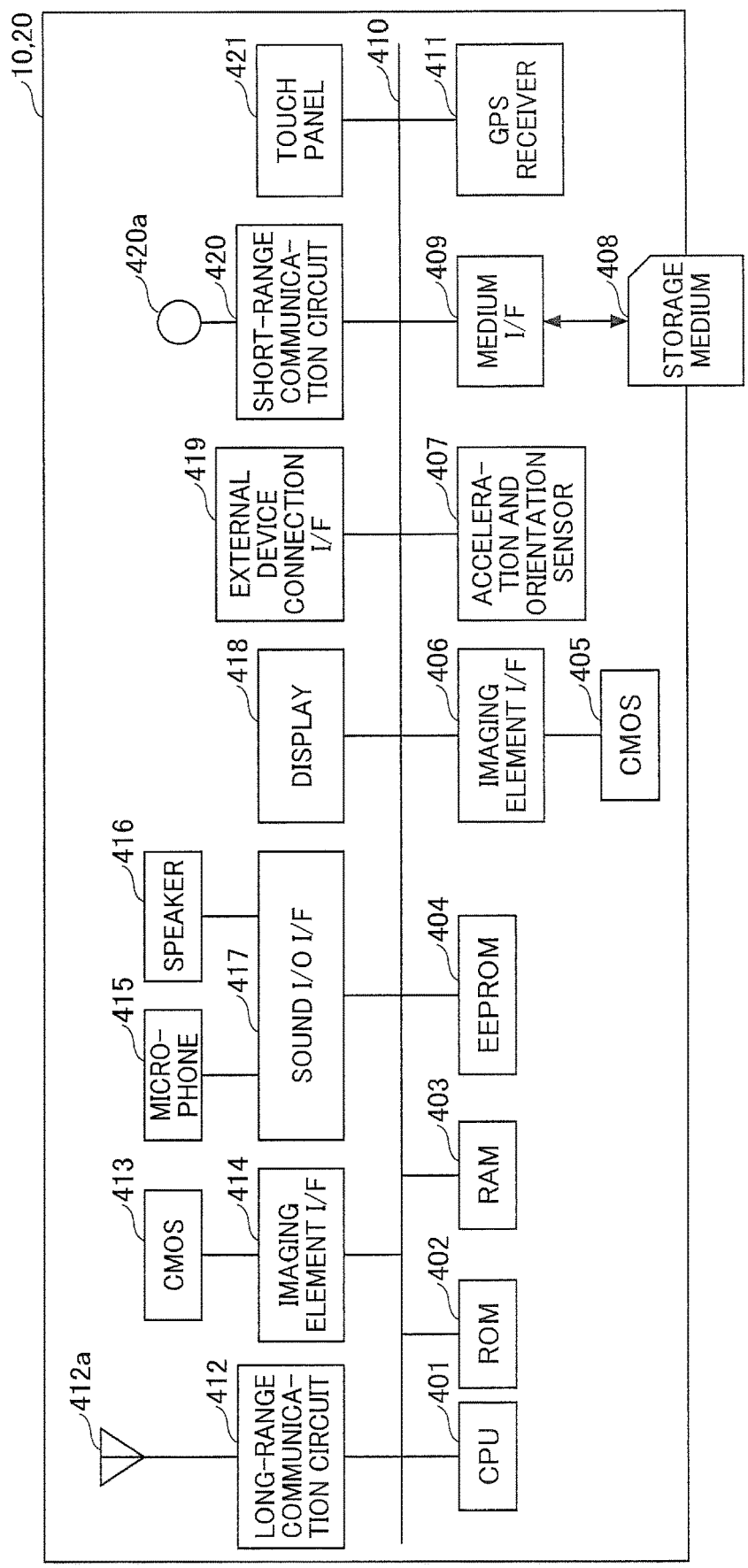
FIG. 3 is a block diagram illustrating an example of a hardware configuration of each of a first terminal device and a second terminal device.
Figure 4:
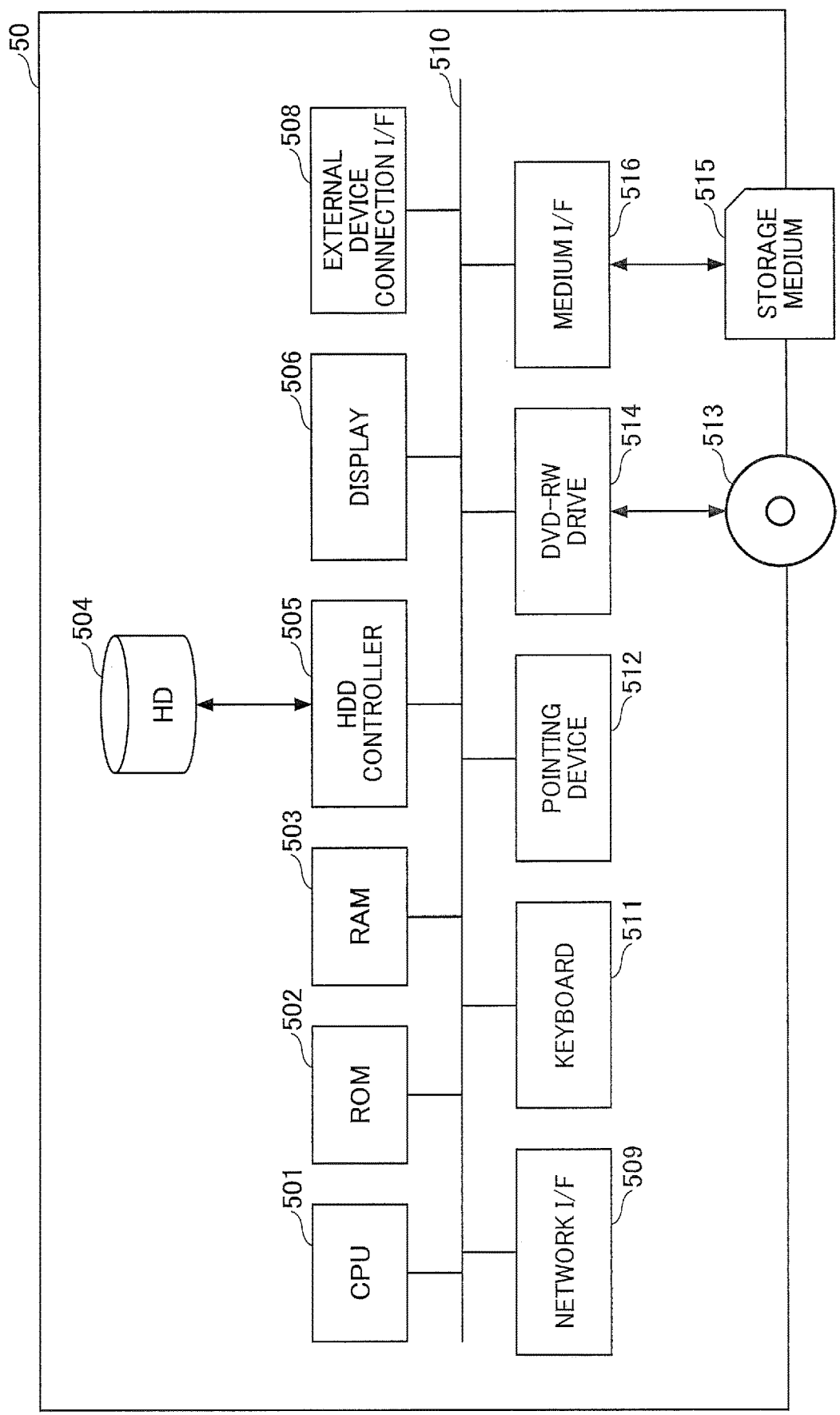
FIG. 4 is a block diagram illustrating an example of a hardware configuration of an information processing system.

With reference to FIGS. 3 and 4, a hardware configuration of the data management system 100 is described according to an embodiment.

FIG. 3 is a block diagram illustrating the hardware configuration of each of the first terminal device 10 and the second terminal device 20. As illustrated in FIG. 3, any one of the first terminal device 10 and the second terminal device 20 includes a central processing unit (CPU) 401, a read only memory (ROM) 402, a random access memory (RAM) 403, an electrically erasable and programmable ROM (EE- PROM) 404, a complementary metal oxide semiconductor (CMOS) sensor 405, an imaging element interface (I/F) 406, an acceleration and orientation sensor 407, a medium I/F 409 and a Global Positioning System (GPS) receiver 411.

The CPU 401 controls the overall operation of any one of the first terminal device 10 and the second terminal device 20. The ROM 402 stores programs such as an initial program loader (IPL) to boot the CPU 401. The RAM 403 is used as a work area for the CPU 401. The EEPROM 404 reads or writes various data such as the program (application) for the first terminal device 10 or the second terminal device 20 under the control of the CPU 401. The CMOS sensor 405 is an example of a built-in imaging device that captures an object (mainly, a self-image of a user) under control of the CPU 401 to obtain image data such as a photograph. The CMOS sensor 405 may be an imaging device such as a charge coupled device (CCD) sensor. The imaging element I/F 406 is a circuit that controls a drive of the CMOS sensor 405. The acceleration and orientation sensor 407 includes various sensors such as an electromagnetic compass for detecting geomagnetism, a gyrocompass, and an acceleration sensor. The medium I/F 409 controls reading or writing (storage) of data to a storage medium 408 such as a flash memory. The GPS receiver 411 receives a GPS signal from a GPS satellite.

Further, any one of the first terminal device 10 and the second terminal device 20 includes a long-range communication circuit 412, a CMOS sensor 413, an imaging element I/F 414, a microphone 415, a speaker 416, a sound input/output (I/O) I/F 417, a display 418, an external device connection I/F 419, a short-range communication circuit 420, an antenna 420a for the short-range communication circuit 420, and a touch panel 421.

The long-range communication circuit 412 is a circuit for communicating with other devices through the network N1. The CMOS sensor 413 is a built-in imaging element for capturing an image of a subject and obtaining image data such as the photograph under the control of the CPU 401. The imaging element I/F 414 is a circuit that controls the drive of the CMOS sensor 413. The microphone 415 is a built-in circuit that converts sound into an electric signal. The speaker 416 is a built-in circuit that generates sound such as music or voice by converting an electric signal into physical vibration. The sound I/O I/F 417 is a circuit that processes sound signal input and output between the microphone 415 and the speaker 416 under the control of the CPU 401. The display 418 is an example of a display device that displays an image of the object, various icons, etc. Examples of the display 418 include a liquid crystal display (LCD) and an organic electroluminescence (EL) display. The external device connection I/F 419 is an interface for connecting various external devices. The short-range communication circuit 420 is a communication circuit such as near field communication (NFC) or BLUETOOTH (registered trademark). The touch panel 421 is an example of an input device that allows a user to operate the first terminal device 10 or the second terminal device 20 by touching a screen of the display 418.

Further, any one of the first terminal device 10 and the second terminal device 20 includes a bus line 410. Examples of the bus line 410 include, but not limited to, an address bus and a data bus, which electrically connects the components such as the CPU 401 illustrated in FIG. 3 with each other.

FIG. 4 is a block diagram illustrating an example of a hardware configuration of the information processing system 50. As illustrated in FIG. 4, the information processing system 50 is implemented by a computer and includes a CPU 501, a ROM 502, a RAM 503, a hard disk (HD) 504, a hard disk drive (HDD) controller 505, a display 506, an external device connection I/F 508, a network I/F 509, a bus line 510, a keyboard 511, a pointing device 512, a digital versatile disk-rewritable (DVD-RW) drive 514, and a medium I/F 516.

The CPU 501 controls entire operation of the information processing system 50. The ROM 502 stores a program such as the IPL used for driving the CPU 501. The RAM 503 is used as a work area for the CPU 501. The HD 504 stores various data such as programs. The HDD controller 505 controls reading and writing operation of various data from and to the HD 504 under control of the CPU 501. The display 506 displays various information such as a cursor, menu, window, character, or image. The external device connection I/F 508 is an interface for connecting various external devices. The external device is, for example, a universal serial bus (USB) memory or a printer. The network I/F 509 is an interface for performing data communication using the networks N1 and N2. The bus line 510 is an address bus, a data bus, or the like for electrically connecting each component such as the CPU 501 illustrated in FIG. 4.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The DVD-RW may be a digital versatile disc-recordable (DVD-R) or the like. The medium I/F 516 controls reading and writing (storing) of data from and to a storage medium 515 such as the flash memory.

The hardware configuration of the third terminal device 30 may be substantially the same as that of FIG. 4.

Figure 5:
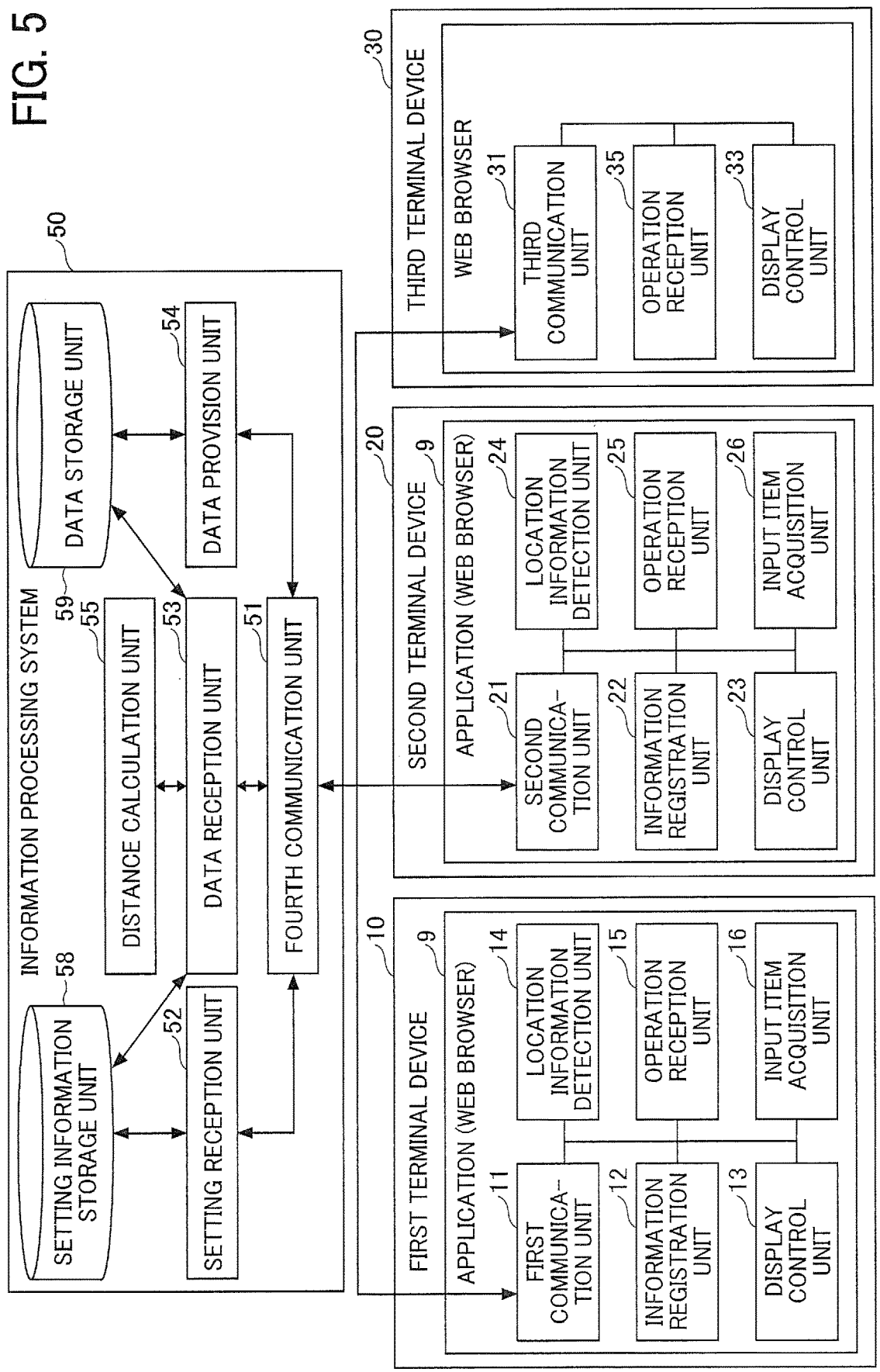
FIG. 5 is a block diagram illustrating an example of a functional configuration of a first terminal device, a second terminal device, a third terminal device, and an information processing system included in the data management system.

With reference to FIG. 5, functions provided by the data management system 100 is described according to an embodiment. FIG. 5 is an example of a functional block diagram illustrating the functions of the first terminal device 10, the second terminal device 20, the third terminal device 30, and the information processing system 50 of the data management system 100.

The first terminal device 10 is mainly used by the safety and health patrol committee member.

The first terminal device 10 includes a first communication unit 11, an information registration unit 12, a display control unit 13, a location information detection unit 14, an operation reception unit 15, and an input item acquisition unit 16. Each of these functional units included in the first terminal device 10 is implemented by operating one or more of the components illustrated in FIG. 3 by an instruction from the CPU 401 according to a program (an application (or web browser) 9) deployed from the EEPROM 404 to the RAM 403. Specifically, the functions illustrated in FIG. 5 are each implemented by the application 9 (or the web browser).

The first communication unit 11 connects to the network N1 and communicates with the information processing system 50 registered in advance in the application. As described above, the first communication unit 11, which connects to the public line (3G, 4G, LTE, etc.), the wireless LAN, or the like, transmits information specifying a task to the information processing system 50, receives a correction request template, and transmits the data input to the input items to the information processing system 50. The transmission means by the first communication unit 11 is not limited to the wireless communication, and the wired LAN or the like may be used.

The location information detection unit 14 detects the current location in real time based on the GPS signal received by the GPS receiver 411. The location information indicating the current location may alternatively be provided by a beacon or the like from a surrounding terminal. In case of indoor, the location information detection unit 14 may detect an indoor location by using Indoor Messaging System (IMES).

The input item acquisition unit 16 acquires the input items corresponding to the task selected by the safety and health patrol committee member from the information processing system 50 through the first communication unit 11. Further, the input item acquisition unit 16 transmits the location information detected by the location information detection unit 14 to the information processing system 50 and acquires a list of correction requests associated with the location information indicating the location close to the location of the detected location information. The input item acquisition unit 16 acquires input items in a form of template.

The information registration unit 12 transmits the data input to the input items to the information processing system 50 through the first communication unit 11. The information registration unit 12 associates the location information detected by the location information detection unit 14 with the input data and transmits the input data to the information processing system 50.

The display control unit 13 generates a screen including a user interface (UI) and displays the screen on the display 418. When the first terminal device 10 executes the application, the information acquired from the information processing system 50 is arranged in a prefixed layout component to generate a screen. When the first terminal device 10 executes the web browser, the screen information transmitted from the information processing system 50 is analyzed and displayed on the display 418.

The operation reception unit 15 receives various operations on the first terminal device 10. The operation reception unit 15 receives from the user, for example, instructions such as a selection of task, input of data to the input items, editing, transmission of the data, and start of communication with the information processing system 50.

The second terminal device 20 is mainly used by the administrator. The second terminal device 20 is different from the first terminal device 10.

The second terminal device 20 includes a second communication unit 21, a display control unit 23, an information registration unit 22, an input item acquisition unit 26, an operation reception unit 25, and a location information detection unit 24. Each of these functional units included in the second terminal device 20 may be the same as the first terminal device 10.

The third terminal device 30 is mainly used by the safety and health patrol committee member to register the template and confirm whether improvement reports have been generated for all correction requests.

The third terminal device 30 includes a third communication unit 31, a display control unit 33, and an operation reception unit 35. The third communication unit 31 transmits and receives various information to and from the information processing system 50. Other functional units included in the third terminal device 30 may be the same as the first terminal device 10.

The information processing system 50 includes a fourth communication unit 51, a setting reception unit 52, a data reception unit 53, a data provision unit 54, and a distance calculation unit 55. Each of these functional units included in the information processing system 50 is a function implemented by operating any of the components illustrated in FIG. 4 by an instruction from the CPU 501 according to a program deployed from the HD 504 to the RAM 503.

The fourth communication unit 51 connects to the network N1 and transmits and receives various data to and from the first terminal device 10, the second terminal device 20, or the third terminal device 30. In the present embodiment, the fourth communication unit 51 mainly receives the data input to the input items from the first terminal device 10 and the second terminal device 20. The fourth communication unit 51 mainly transmits the data input to the input items to the third terminal device 30. In addition, the fourth communication unit 51 may receive authentication information from the first terminal device 10, the second terminal device 20, or the third terminal device 30.

Since the information processing system 50 resides in a data center or the like, the fourth communication unit 51 is connected to a high-speed LAN or the like. The fourth communication unit 51 is not directly connected to the public line and communicates with the first terminal device 10, the second terminal device 20, or the third terminal device 30 through a gateway of telephone company.

The setting reception unit 52 receives a plurality of task settings for the task registration information. Multiple tasks can be associated with one another. Further, the setting reception unit 52 accepts the settings of the input items for each task. The setting reception unit 52 stores the input items for each task as a template in the setting information storage unit 58. The template for the correction request is called the correction request template, and the template for the improvement report is called the improvement report template.

The data reception unit 53 receives registration of data using the template for each task from the first terminal device 10 and the second terminal device 20. The distance calculation unit 55 calculates the distance between the location information of the first terminal device 10 and the location information of the second terminal device 20.

Based on the calculated distance, the data reception unit 53 transmits a list of correction requests to the second terminal device 20, and receives data related to the improvement report from the second terminal device 20. The data reception unit 53 stores the data related to the correction request and the data related to the improvement report in the data storage unit 59 in association with each other.

The data provision unit 54 provides, for example, the data stored in the data storage unit 59 to, for example, the third terminal device 30 in response to a request from the third terminal device 30.

The setting reception unit 52, the data reception unit 53, or the data provision unit 54 may generate screen information of the screen displayed by the web browser of the terminal device. The screen information is a program described in HyperText Markup Language (HTML), Extensible Markup Language (XML), a script language, and cascading style sheet (CSS). The structure of the web page is mainly specified by HTML, the operation of the web page is specified by the script language, and the style of the web page is specified by CSS. An application implemented by a collaboration between a web server and a program executed by a web browser is called a web application.

Figure 6:
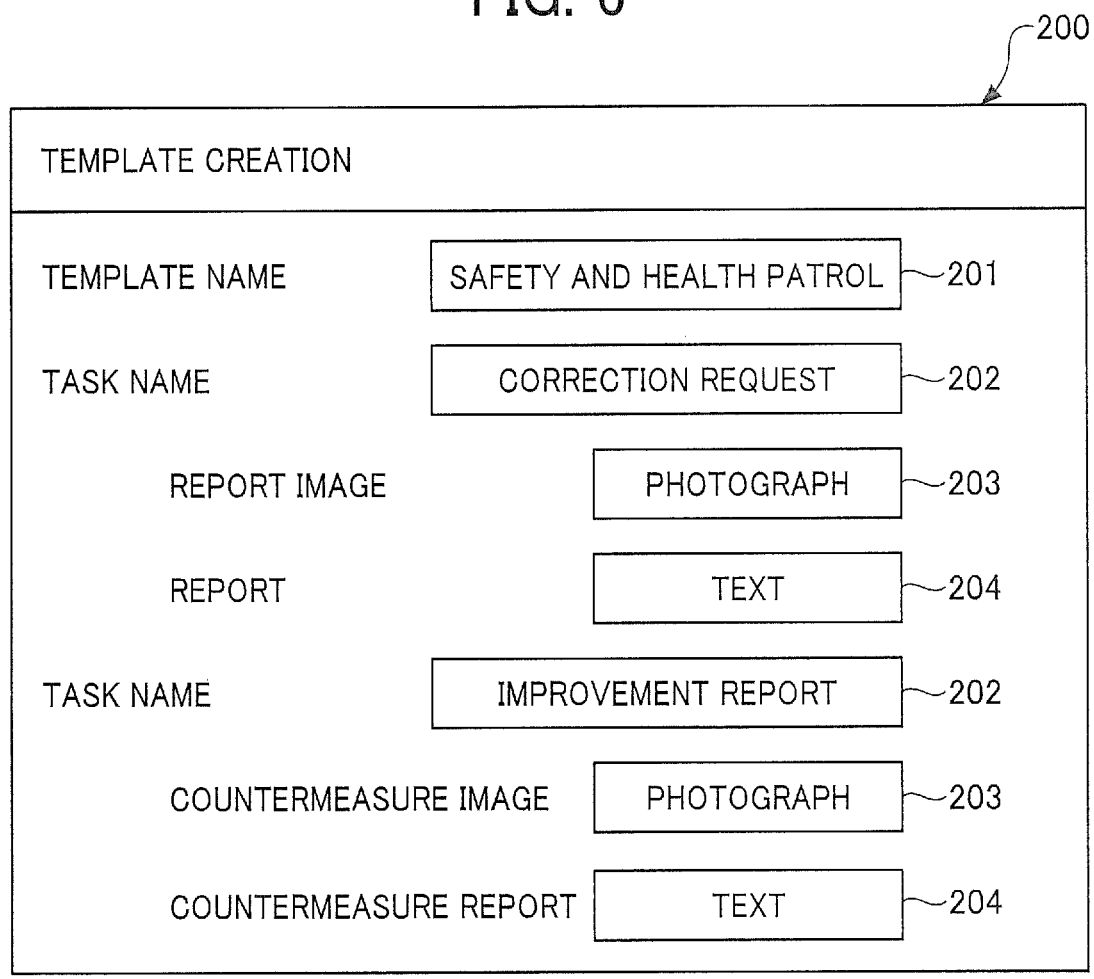
FIG. 6 is a diagram illustrating an example of a template creation screen displayed by the third terminal device.

FIG. 6 is a diagram illustrating an example of a template creation screen 200 displayed by the third terminal device 30. The setting reception unit 52 of the information processing system 50 provides the template creation screen 200 of FIG. 6 to the third terminal device 30. The third terminal device 30 receives a registration of template from the template creation screen 200.

The template creation screen 200 includes a template name field 201 and two or more task name fields 202. The safety and health patrol committee member enters the name of the template, in the template name field 201. Also, the safety and health patrol committee member sets, for example, the correction request and the improvement report in the task name field 202.

In response to setting the task, the safety and health patrol committee member can add input items. In FIG. 6, input items "photograph" 203 and "text" 204 are set for the correction request task, and "report image" and "report" are set as item names respectively. The safety and health patrol committee member can set whether each input item is mandatory. In addition, when the application transmits data to the information processing system 50, the safety and health patrol committee member sets whether the content entered in the input items will be taken over in the second and subsequent correction requests and improvement reports or will be cleared. (refer to FIGS. 9 and 13 for mandatory item and clearing when transmitting). Regarding the setting method, for example, the third terminal device 30 may display a check box for each input item, and the safety and health patrol committee member may select the check box to make the settings. Note that the check box is just an example and the settings may be made using a radio button, a drop-down list, or the like.

As a data transfer method, for example, the information processing system 50 or the third terminal device 30 stores the input contents of the input items that are not set to clear at the time of transmission, and at the time of inputting the correction request and the improvement report from the second time onward, the screen in which the terminal device (such as the first terminal device 10 or the second terminal device 20) displays the input contents stored in the information processing system 50 or the third terminal device 30 in the input items may be displayed.

When the safety and health patrol committee member sets a plurality of tasks in the same task registration information, the applications of the first terminal device 10 and the second terminal device 20 display a button for each job. Since the information processing system 50 transmits the template corresponding to the button pressed by the safety and health patrol committee member or the administrator to the application, the user can input the input items according to the task. The information processing system 50 may transmit all the templates of each task together with a list of a plurality of tasks to the first terminal device 10 and the second terminal device 20, and in response to a selection of the task by the user, the applications of the first terminal device 10 and the second terminal device 20 may display input items according to the task.

Further, since a plurality of tasks are associated with the task registration information, the data provision unit 54 can provide the data input to the third terminal device 30 in the plurality of tasks in the same screen.

Figure 7:
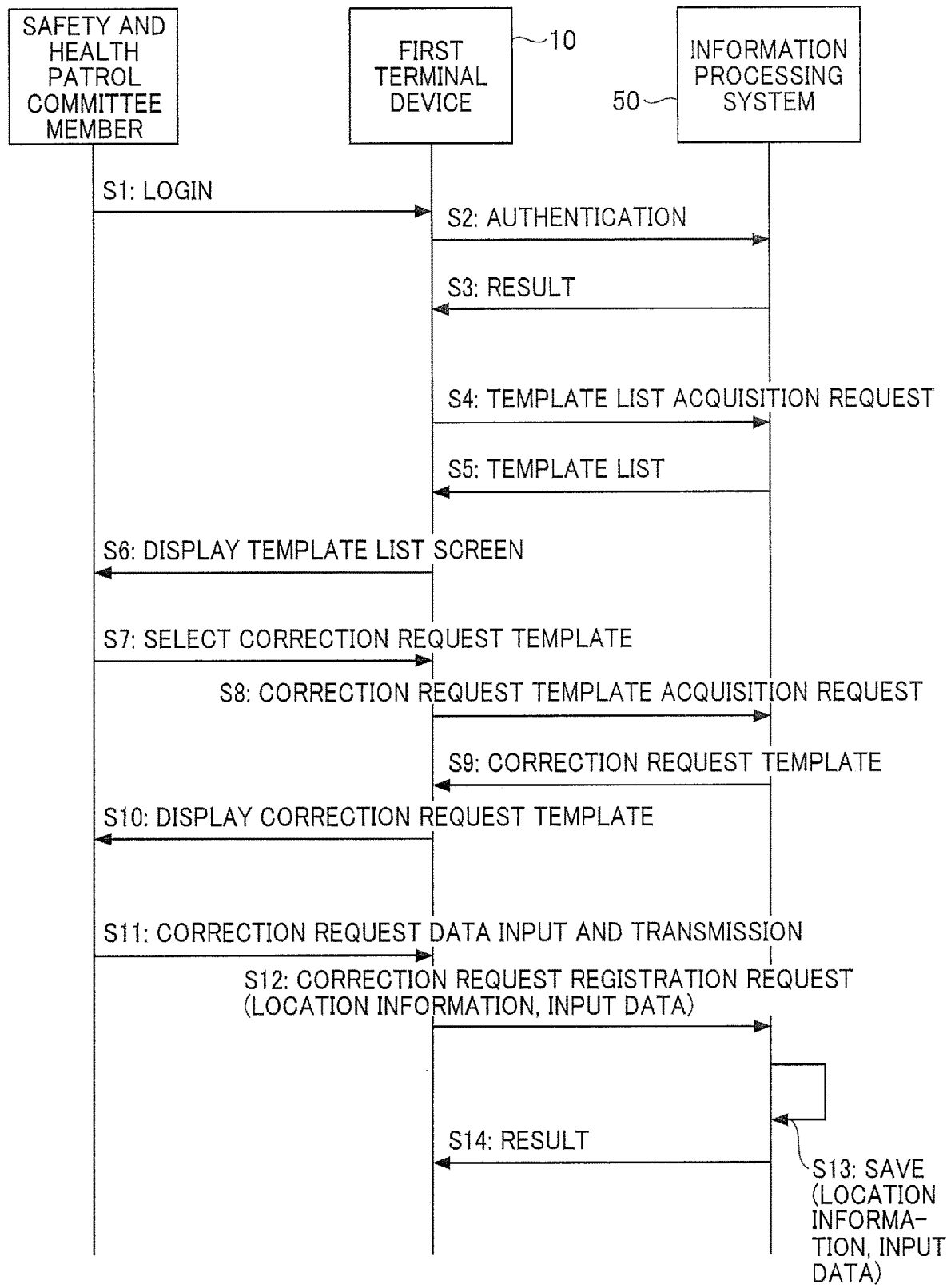
FIG. 7 is a sequence diagram illustrating an example of a process in which the first terminal device registers data input in a correction request template in the information processing system in response to an operation of a safety and health patrol committee member.

With reference to FIG. 7, a process for the safety and health patrol committee member to register the correction request data in the information processing system 50 is described. FIG. 7 is a sequence diagram illustrating an example of a process in which the first terminal device 10 registers data input in the correction request template in the information processing system 50 in response to an operation of the safety and health patrol committee member.

Figure 8:
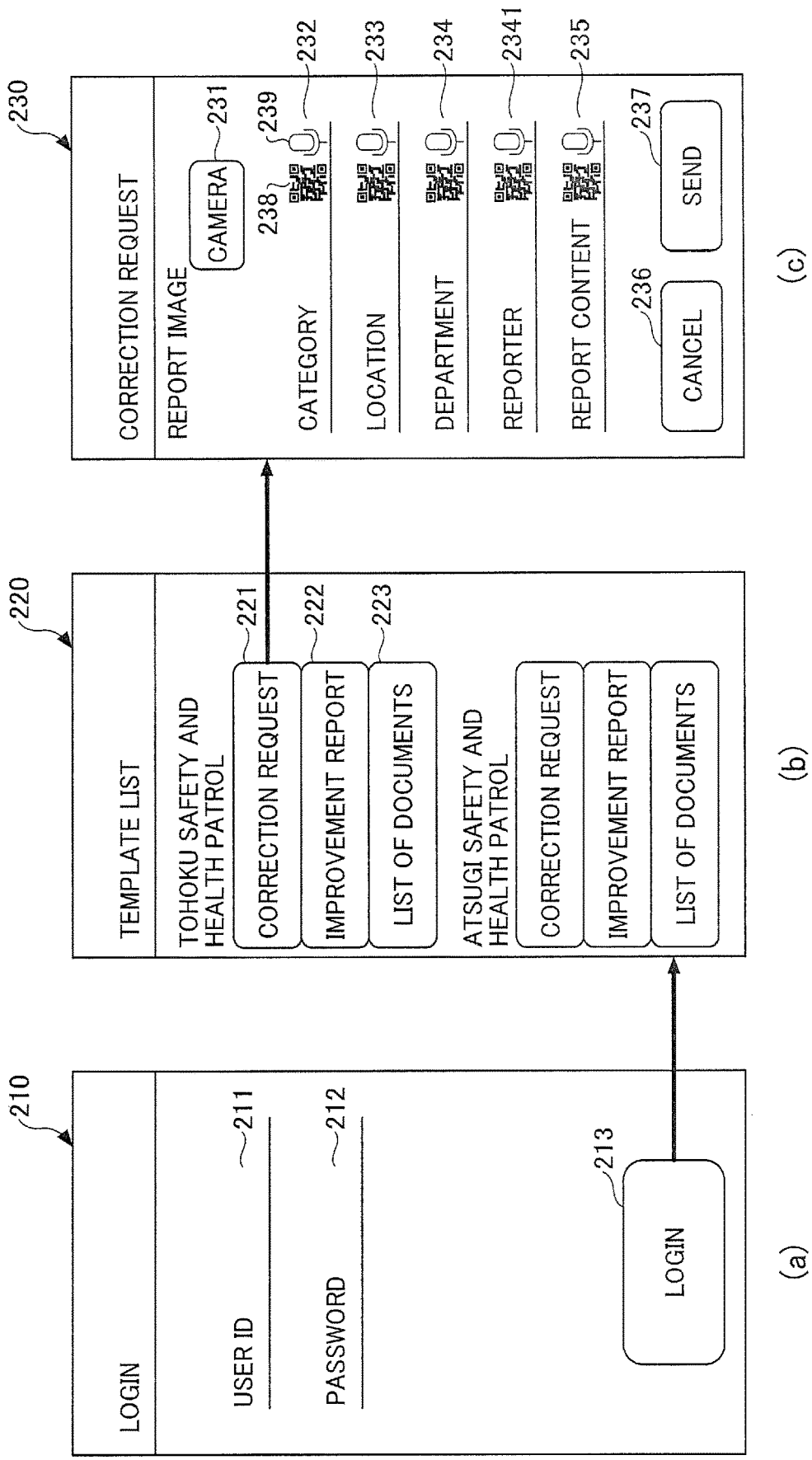
FIG. 8 is a diagram illustrating an example of a screen displayed by the first terminal device when the safety and health patrol committee member registers the data input in the correction request template.

In step S1, the safety and health patrol committee member starts the application of the first terminal device 10 and performs a login operation. When the safety and health patrol committee member has logged in in the past, the safety and health patrol committee member can log in automatically by starting the application since the application stores the token. When the safety and health patrol committee member logs in for the first time, the safety and health patrol committee member enters a user identifier (ID) and password. FIG. 8 (*a*) illustrates an example of the login screen.

In step S2, the operation reception unit 15 of the first terminal device 10 receives the operation, and the first communication unit 11 specifies login information (token or user ID and password) and transmits an authentication request to the information processing system 50. The first communication unit 11 may transmit biometric authentication information such as a fingerprint.

In step S3, the fourth communication unit 51 of the information processing system 50 receives the authentication request and performs the authentication process based on the user information registered in advance. For example, the fourth communication unit 51 determines whether the user ID and password transmitted from the first terminal device 10 have been registered in the user information. The fourth communication unit 51 transmits the authentication result (success, failure) of the safety and health patrol committee member to the first terminal device 10.

In step S4, the first communication unit 11 of the first terminal device 10 receives the authentication result. When the authentication is successful, the input item acquisition unit 16 of the first terminal device 10 transmits a template list acquisition request to the information processing system 50 through the first communication unit 11. The input item acquisition unit 16 designates task registration information "safety and health patrol".

In step S5, the fourth communication unit 51 of the information processing system 50 receives the template list acquisition request and transmits to the first terminal device 10, a list of templates for task registration information "safety and health patrol" acquired by the data reception unit 53 from the setting information storage unit 58. In other words, the list of templates set in FIG. 6 is transmitted.

In step S6, the first communication unit 11 of the first terminal device 10 receives the template list, and the display control unit 13 displays the template list on the display. FIG. 8 (*b*) illustrates an example of the template list screen.

In step S7, the safety and health patrol committee member selects, for example, a correction request template from the template list. The operation reception unit 15 receives the user's selection.

In step S8, the first communication unit 11 of the first terminal device 10 transmits the acquisition request of the selected correction request template to the information processing system 50.

In step S9, the fourth communication unit 51 of the information processing system 50 receives the correction request template acquisition request, and the data reception unit 53 acquires the correction request template from the setting information storage unit 58. The fourth communication unit 51 transmits the correction request template to the first terminal device 10. Information included in the correction request template is illustrated in FIG. 9. In other words, the input items set for the correction request task in FIG. 6 are transmitted.

In step S10, the first communication unit 11 of the first terminal device 10 receives the correction request template, and the display control unit 13 displays the input items based on the correction request template on the display. The correction request template includes, for example, the type of input item (image, options, text, date and time, user) and the name of the input item. FIG. 8 (*c*) illustrates an example of the correction request template screen.

The first communication unit 11 of the first terminal device 10 may receive the correction request template in step S7. In this case, the display control unit 13 can display the input items based on the correction request template on the display by the screen transition without communicating with the information processing system 50. The previous data is displayed for input items for which clear at the time of transmission is not set.

In step S11, the safety and health patrol committee member inputs necessary items based on the displayed input items and generates data related to the correction request. The operation reception unit 15 receives data input and transmission. The operation reception unit 15 does not accept the transmission of data when the required items are not entered. Further, the data of the input items for which clear when transmitting is set is not stored in the first terminal device 10 or the information processing system 50 (the data does not remain in the first terminal device 10 or the information processing system 50). The data of the input items for which clear when transmitting is not set is stored in the first terminal device 10 or the information processing system 50 for use in the second and subsequent correction requests.

In step S12, the information registration unit 12 of the first terminal device 10 transmits the input data and the location information of the first terminal device 10 detected by the location information detection unit 14 through the first communication unit 11 to the information processing system 50. The location information detection unit 14 detects the current location information immediately before data transmission, during the process of FIG. 7, or in response to a request from the information processing system 50.

In step S13, the fourth communication unit 51 of the information processing system 50 receives the input data and the location information, and the data reception unit 53 stores the input data and the location information in the data storage unit 59 in association with each other. FIG. 10 illustrates an example of the information stored in the data storage unit 59.

In step S14, the fourth communication unit 51 of the information processing system 50 transmits the registration result to the first terminal device 10.

The information processing system 50 transmits an e-mail or the like to the administrator associated with the location of the correction request newly registered in the data storage unit 59 or the department that manages the correction request newly registered. As a result, the administrator of the place of the correction request can start working on the improvement task.

FIG. 8 is a diagram illustrating examples of the screens displayed by the first terminal device 10 when the safety and health patrol committee member enters the data in the correction request template.

FIG. 8 (*a*) is an example of the login screen 210. The login screen 210 includes a user ID field 211, a password field 212, and a login button 213. The user ID field 211 is a field for the safety and health patrol committee member to enter the identification information of the safety and health patrol committee member. The password field 212 is a field for the safety and health patrol committee member to enter the password of the safety and health patrol committee member. The login button 213 is a button for the safety and health patrol committee member to send an authentication request to the first terminal device 10.

FIG. 8 (*b*) is an example of the template list screen 220. The template list screen 220 displays a list of task templates registered in the task registration information. In the figure, the templates are displayed for each site, but the task templates may be common to all sites.

The task registration information templates includes a correction request template, an improvement report template, and a document list template. The template list screen 220 includes a correction request button 221, an improvement report button 222, and a document list button 223 for each site. The correction request button 221 is a button for the safety and health patrol committee member to request the correction request template from the information processing system 50. The improvement report button 222 is a button for the safety and health patrol committee member to request the improvement report template from the information processing system 50. The document list button 223 is a button for the safety and health patrol committee member to request the information processing system 50 for a list of registered data for task registration information.

FIG. 8 (*c*) is an example of the correction request template screen 230. The correction request template screen 230 includes a camera button 231, a category field 232, a location field 233, a department field 234, a reporter field 2341, a report content field 235, a cancel button 236, and a send button 237. The items displayed on the correction request template screen 230 are displayed based on the template of FIG. 9. The camera button 231 is a button for the user to activate the camera. The category field 232 is a field for the safety and health patrol committee member to set a trigger of the correction request such as voluntary or pointed out. The location field 233 indicates the location subject to the correction request. The department field 234 indicates the department managing the location. The reporter field 2341 indicates the name of the reporter (safety and health patrol committee member). The report content field 235 is a field in which the safety and health patrol committee members enter the specific content of the correction request. The cancel button 236 is a button for the safety and health patrol committee member to discard the input data and return to the template list screen of FIG. 8 (*b*). The send button 237 is a button for the safety and health patrol committee member to send the input data to the information processing system 50.

Each item of FIG. 8 (*c*) includes an image code capture button 238 and a voice input button 239. When the safety and health patrol committee member presses the image code capture button 238, the camera is activated, and the safety and health patrol committee member can capture an image code such as a QUICK RESPONSE (QR) code (registered trademark). The application can decode the text contained in the image code and enter the text in the input item. The image code includes the name of the place, etc., and assists the input of the safety and health patrol committee member. When the safety and health patrol committee member presses the voice input button 239, the microphone is activated and the safety and health patrol committee member can input text by voice.

FIG. 9 is a diagram illustrating the correction request template transmitted from the information processing system 50 to the first terminal device 10. The correction request template includes input item, input format, mandatory item, and clear after transmission in association with each other. Each item is set on the template creation screen 200 of FIG. 6. The report image is the item name of the camera button in FIG. 8 (*c*). The category is the item name of the category field in FIG. 8 (*c*). The location is the item name of the location field in FIG. 8 (*c*). The department is the item name of the department field in FIG. 8 (*c*). The reporter is the item name of the reporter field in FIG. 8 (*c*). The report content is the item name of the report content field in FIG. 8 (*c*).

The input format indicates the format of the input data. The mandatory item is an item in which the application cannot send data to the information processing system 50 unless the safety and health patrol committee member inputs the data (the send button 237 becomes half-bright, or the send button 237 does not respond).

Clear after transmission indicates that the item is cleared when the application transmits data to the information processing system 50. Items that are not cleared can be stored for the safety and health patrol committee members to be used in the next correction request.

FIG. 10 is a diagram illustrating an example of data stored in the data storage unit 59 of the information processing system 50. The data stored in the data storage unit 59 includes posted date and time, report image, category, location, department, reporter, report content, and location information. The posted date and time is the date and time when the data input by the safety and health patrol committee member is transmitted to the information processing system 50 or the date and time when the information processing system 50 received the data. The report image is the photograph of the site of the correction request taken by the safety and health patrol committee member by pressing the camera button in FIG. 8 (*c*). The category is the data entered in the category field in FIG. 8 (*c*). The location is the data entered in the location field in FIG. 8 (*c*). The department is the data entered in the department field in FIG. 8 (*c*). The reporter is data entered in the reporter field in FIG. 8 (*c*). The report content is data entered in the report content field in FIG. 8 (*c*). The location information (for example, latitude, longitude) indicates the location where the first terminal device 10 sent the correction request. The location information may be a floor or room number.

Figure 11:
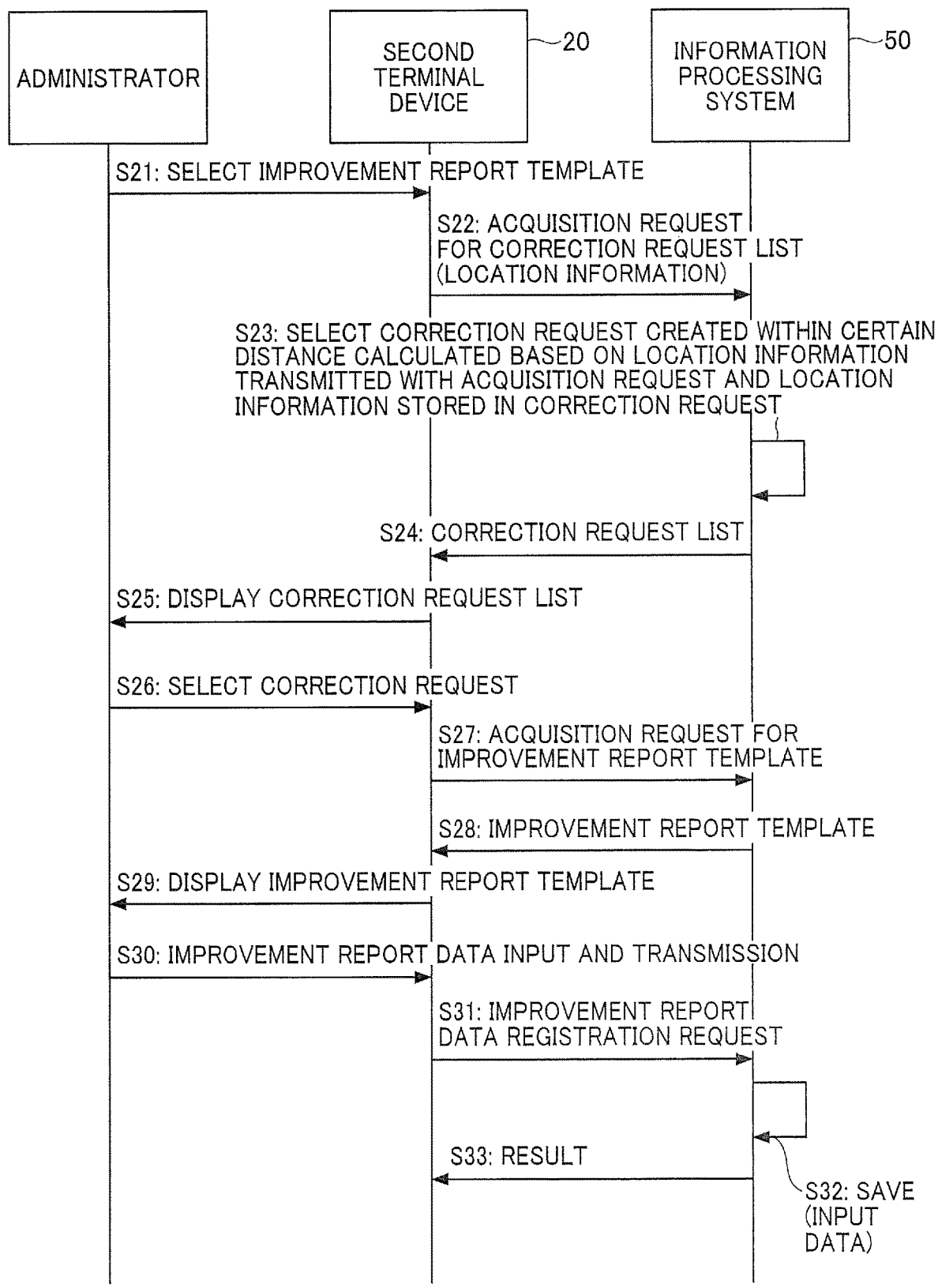
FIG. 11 is a sequence diagram illustrating an example of a process in which the first terminal device registers data input in an improvement report template in the information processing system in response to an operation of an administrator.

With reference to FIG. 11, a process in which the administrator of the place where the correction is pointed out registers the data of the improvement report in the information processing system 50 is described. FIG. 11 is a sequence diagram illustrating an example of the process in which the second terminal device 20 registers data input in the improvement report template in the information processing system 50 in response to an operation of the administrator.

Figure 12:
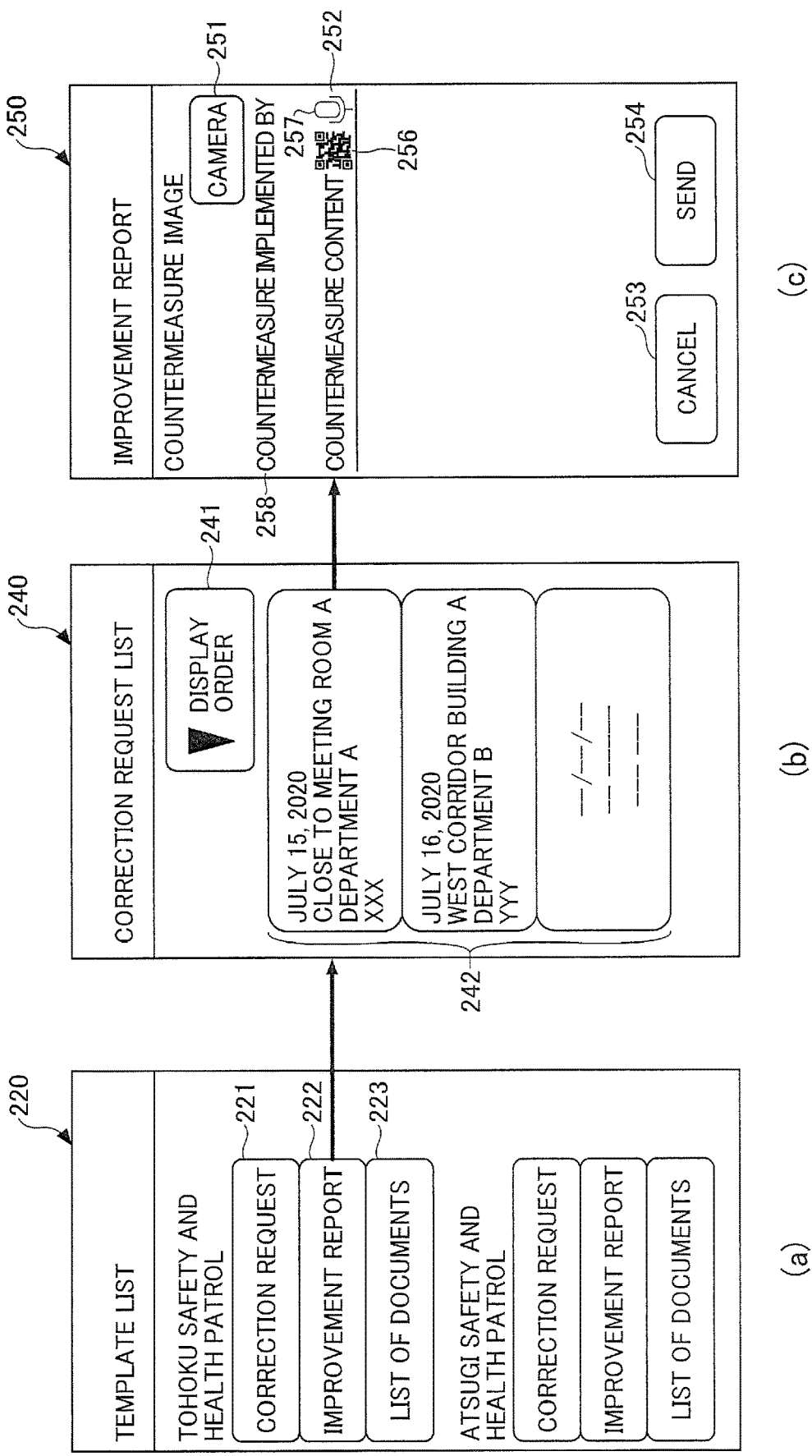
FIG. 12 is a diagram illustrating an example of a screen displayed by the second terminal device when the administrator registers the data input to the improvement report template.

The second terminal device 20 displays the template list screen in the same process as in steps S1 to S6 of FIG. 7. FIG. 12 (*a*) illustrates an example of the template list screen.

In step S21, the administrator selects, for example, the improvement report template from the template list. The operation reception unit 25 receives the user's selection.

In step S22, in response to the selection of the improvement report template, the second communication unit 21 of the second terminal device 20 transmits the acquisition request of the list of correction requests and the location information of the second terminal device 20 detected by the location information detection unit 24 to the information processing system 50. The location information detection unit 24 detects the current location information immediately before transmitting the acquisition request of the correction request list, during the process of FIG. 11, or in response to the request from the information processing system 50.

Figure 15:
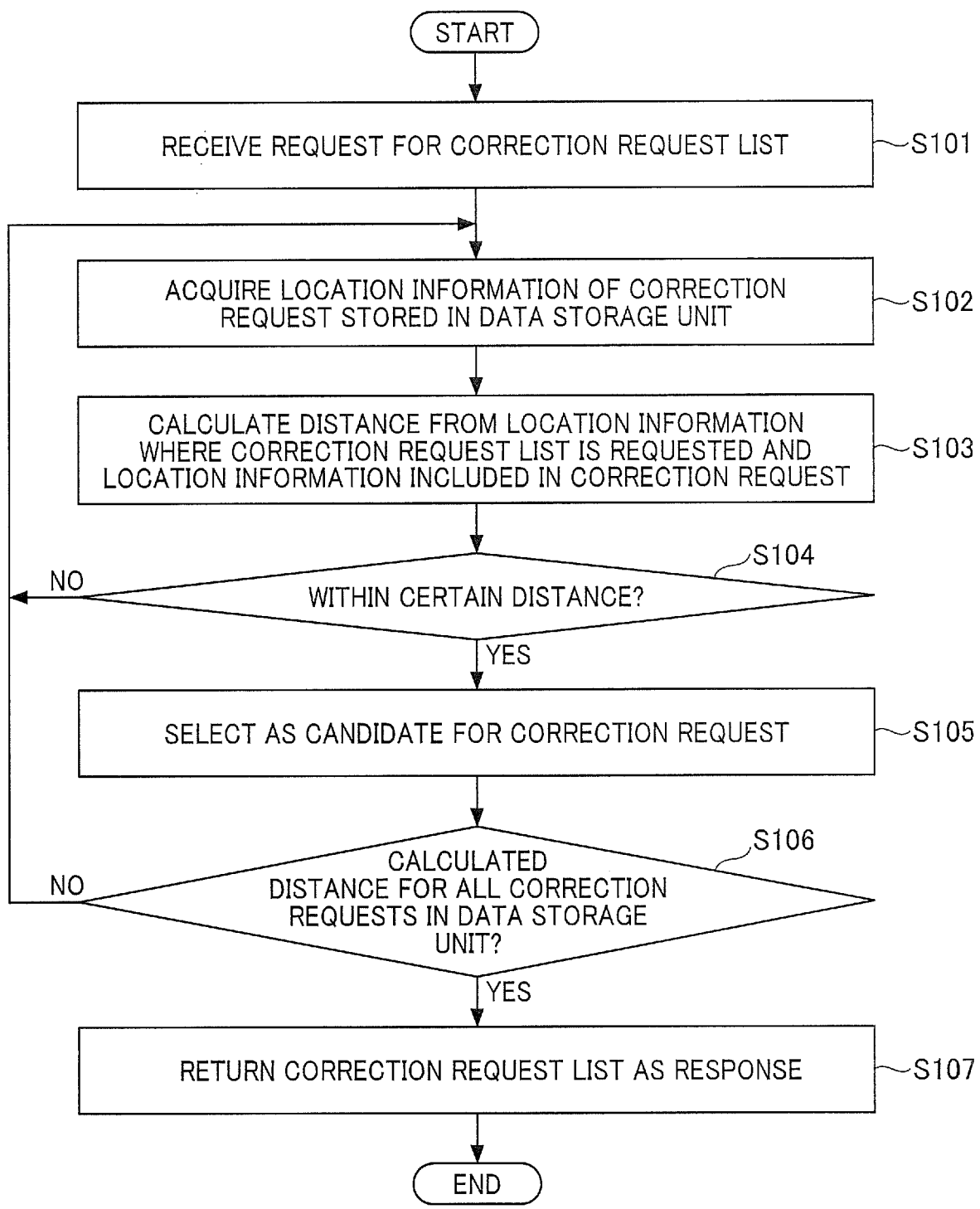
FIG. 15 is a flowchart illustrating an example of a process in which a data reception unit of the information processing system creates a list of correction requests based on the location information of the administrator.

In step S23, the fourth communication unit 51 of the information processing system 50 receives the acquisition request of the correction request list and the location information, and the data reception unit 53 acquires the correction request list from the data storage unit 59. The distance calculation unit 55 calculates the distance from the location information of the second terminal device 20 and the location information associated with the correction request of the data storage unit 59. The user may be able to change the distance used in this determination. The details of this process is illustrated in FIG. 15.

In step S24, the data reception unit 53 transmits the list of correction requests within a certain distance to the second terminal device 20 through the fourth communication unit 51 as a candidate. In other words, the fourth communication unit 51 transmits to the second terminal device 20 a list of correction requests determined based on the location information transmitted from the second terminal device 20 and the location information of the first terminal device.

In step S25, the second communication unit 21 of the second terminal device 20 receives the list of correction requests, and the display control unit 23 displays the list of correction requests on the display. A correction request list screen is illustrated in FIG. 12 (*b*).

The second terminal device 20 may acquire all the correction requests, and the second terminal device 20 may calculate and display the distance. When the second terminal device 20 displays the list of correction requests by calculating the distance, the correction requests can be displayed in the order of the closest distance. When the number of lists is large, it takes time to calculate by the second terminal device 20, so it may be preferable that the second terminal device 20 displays the candidates selected by the information processing system 50.

In step S26, the administrator selects the correction request corresponding to the improvement report to be prepared by the administrator. The operation reception unit 25 receives the selection.

In step S27, the input item acquisition unit 26 of the second terminal device 20 transmits a request for acquiring an improvement report template to the information processing system 50 through the second communication unit 21, in response to a request from the administrator.

In step S28, the fourth communication unit 51 of the information processing system 50 receives the improvement report template acquisition request, and the data reception unit 53 acquires the improvement report template from the setting information storage unit 58. Then, the fourth communication unit 51 transmits the improvement report template to the second terminal device 20. The information contained in the template is illustrated in FIG. 13. In other words, the input items set for the improvement report task in FIG. 6 are transmitted.

In step S29, the second communication unit 21 of the second terminal device 20 receives the improvement report template, and the display control unit 23 displays the improvement report template on the display. The template includes, for example, the type of input item (image, options, text, date, time, and user) and the input item name. FIG. 12 (*c*) illustrates an example of the improvement report input screen. The previous data is displayed for input items for which clear after transmission is not set.

In step S30, the administrator inputs the input items based on the displayed improvement report template and generates the improvement report data. The operation reception unit 15 receives input of data and instruction for transmission. The operation reception unit 15 does not accept the transmission of data when the mandatory item is not entered. Further, the data of the input items for which clear when transmitting is set is not stored in the first terminal device 10 or the information processing system 50 (the data does not remain in the first terminal device 10 or the information processing system 50). The data of the input items for which clear after transmission is not set is stored in the first terminal device 10 or the information processing system 50 for use in the second and subsequent improvement reports.

In step S31, the information registration unit 22 of the second terminal device 20 transmits the identification information of the correction request selected in step S26 and the input data to the information processing system 50 through the second communication unit 21.

In step S32, the fourth communication unit 51 of the information processing system 50 receives the input data, and the data reception unit 53 stores the data in the data storage unit 59 in association with the correction request selected in step S26. FIG. 14 illustrates an example of the data stored in the data storage unit 59.

In step S33, the information processing system 50 returns the registration result to the second terminal device 20.

FIG. 12 is a diagram illustrating an example of a screen displayed by the second terminal device 20 when the administrator registers the data input to the improvement report template.

FIG. 12 (*a*) is an example of the template list screen 220. The template list screen 220 may be the same as FIG. 8 (*b*).

FIG. 12 (*b*) is an example of the correction request list screen 240. The correction request list screen 240 includes a display order button 241 and a correction request list 242. The display order button 241 is a button for the administrator to set whether the second terminal device 20 displays the list of correction requests in the order of closer distance or farther distance. The correction request list 242 is a list of correction requests transmitted by the information processing system 50.

FIG. 12 (*c*) is an example of an improvement report input screen 250. The improvement report input screen 250 includes a camera button 251, a countermeasure implementer field 258, a countermeasure content field 252, a cancel button 253, and a send button 254. The camera button 251 is a button for the administrator to activate the camera. The countermeasure implementer field 258 is a field for the administrator to input the name and the like of the administrator who made the improvement. The countermeasure content field 252 is a field for the administrator to input what kind of countermeasure has been taken. The cancel button 253 is a button for the administrator to discard the input contents and return to the correction request list screen 240 of FIG. 12 (*b*). The send button 254 is a button for the administrator to send the input contents to the information processing system 50.

The item of the improvement report input screen 250 includes an image code capture button 256 and a voice input button 257. These functions are the same as the image code capture button 238 and the voice input button 239.

FIG. 13 is a diagram illustrating the improvement report template transmitted from the information processing system 50 to the second terminal device 20. The improvement report template includes input items, input format, mandatory item, and items to be cleared when transmitting in association with each other. Each item is set on the template creation screen 200 of FIG. 6. The report image is the item name of the camera button in FIG. 12 (*c*). The countermeasure implementer is the item name of the countermeasure implementer field in FIG. 12 (*c*). The countermeasure content is the item name of the countermeasure content field in FIG. 12 (*c*).

The input format, mandatory item, and clear after transmission may be the same as in FIG. 9.

FIG. 14 is a diagram illustrating an example of data stored in the data storage unit 59 of the information processing system 50. The data storage unit 59 of FIG. 14 stores posted date and time, report image, category, location, department, reporter, report content, location information, posted date and time, countermeasure image, countermeasure implementer, and countermeasure content. Therefore, the posted date and time, the countermeasure image, the countermeasure implementer, and the countermeasure content are added to the items of the data storage unit 59 in FIG. 10. The posted date and time is the date and time when the administrator sends the improvement report to the information processing system 50 or the date and time when the information processing system 50 receives the improvement report. The report image is the photograph of the improvement site taken by the administrator by pressing the camera button in FIG. 12 (*c*). The countermeasure implementer is the information input in the countermeasure implementer field in FIG. 12 (*c*). The countermeasure content is the information input in the countermeasure content field in FIG. 12 (*c*).

The information of the data storage unit 59 of FIG. 12 can be displayed by the third terminal device 30, and the safety and health patrol committee member can determine at a glance whether or the improvement report has been made in response to the correction request.

FIG. 15 is a flowchart illustrating an example of a process in which a data reception unit 53 of the information processing system 50 creates the list of correction requests based on the location information of the administrator.

In step S101, the fourth communication unit 51 receives an acquisition request of the list of correction requests.

In step S102, the data reception unit 53 acquires the location information included in the correction request stored in the data storage unit 59.

In step S103, the distance calculation unit 55 calculates the distance between the location information transmitted from the second terminal device 20 and the location information acquired from the data storage unit 59. The calculated distance may be a direct distance.

In step S104, the data reception unit 53 determines whether the calculated distance is within a certain distance.

In step S105, the data reception unit 53 selects a list of correction requests within the certain distance as candidates.

In step S106, the data reception unit 53 determines whether the distance has been calculated for all the correction requests in the data storage unit 59.

When the determination in step S106 is No, the data reception unit 53 executes the processes in step S102 and subsequent steps.

In step S107, when the determination in step S106 is Yes, the data reception unit 53 transmits the candidates for the correction request list to the second terminal device 20 as a list.

In this way, since the list of correction requests is displayed based on the distance from the administrator, the administrator can easily select the correction request created at the improvement site where the administrator is. The information processing system 50 can register an improvement report in association with the correction request.

In the data storage unit 59 of the information processing system 50, the location information associated with the correction request may also be the location information included in the photograph of the correction request.

Since the safety and health patrol committee member is not one and since many correction requests are made, it may be necessary to confirm whether a correction request has been created. In the present embodiment, the location information of the safety and health patrol committee member can be used even for the safety and health patrol committee member to confirm whether the correction request has been created.

Figure 16:
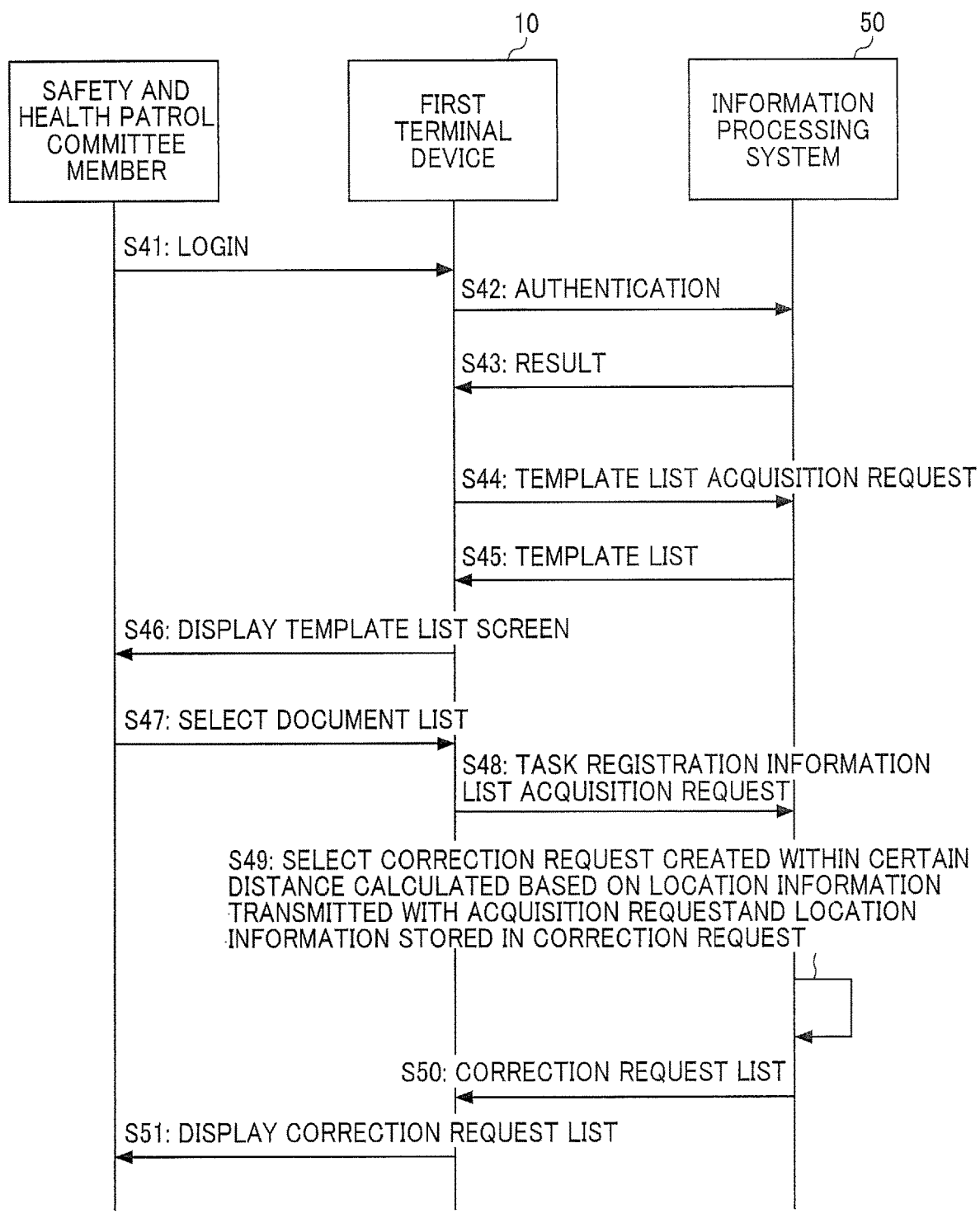
FIG. 16 is a sequence diagram illustrating an example of a process in which the first terminal device displays a list of task registration information of the data storage unit in response to an operation by a safety and health patrol committee member.

FIG. 16 is an example of a sequence diagram illustrating a process in which the first terminal device 10 displays a list of task registration information of the data storage unit 59 in response to an operation by the safety and health patrol committee member.

Figure 17:
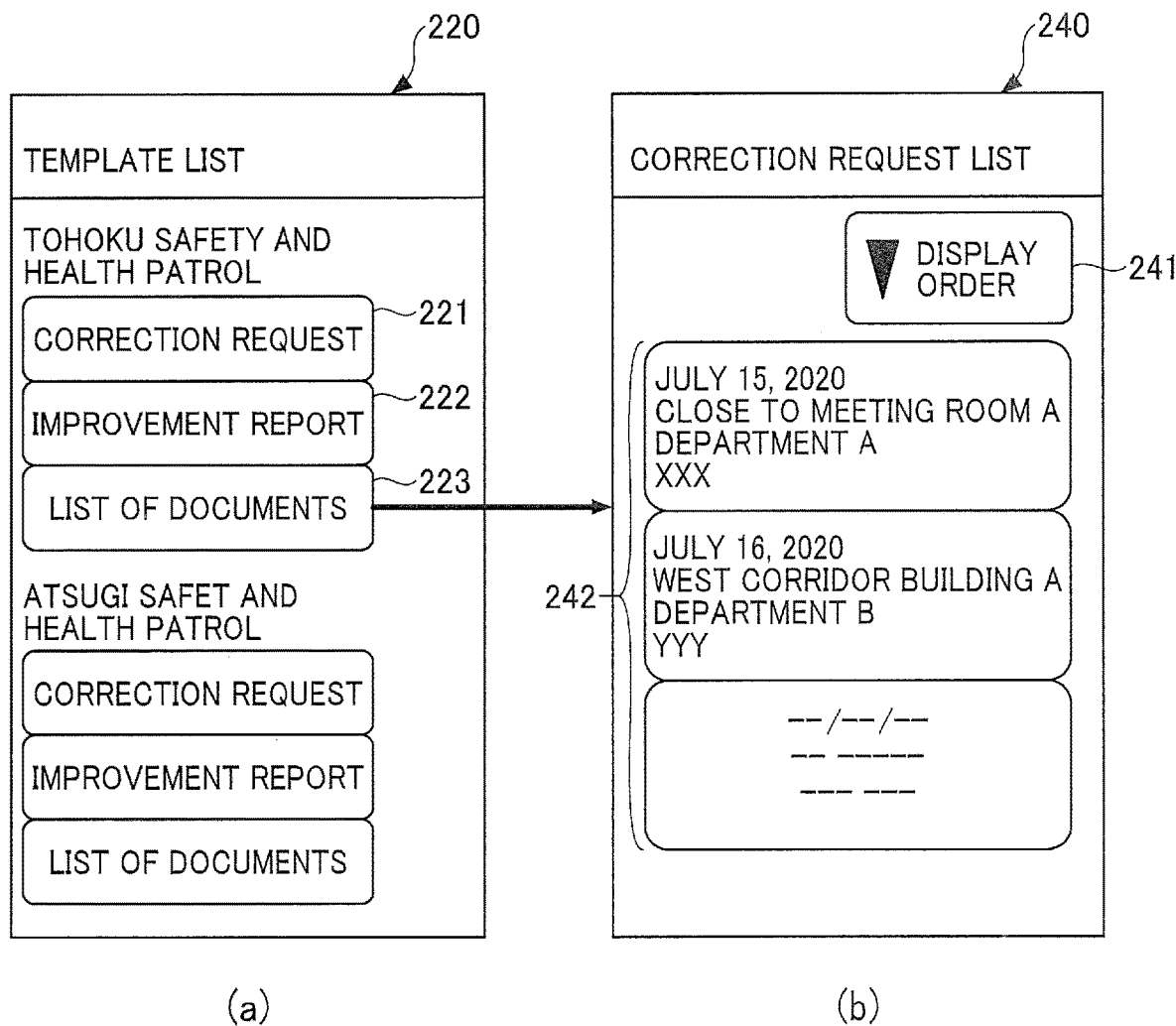
FIG. 17 is a diagram illustrating an example of a screen displayed by the first terminal device when the safety and health patrol committee member confirms a list of correction requests.

In steps S41 to S46, the first terminal device 10 displays the template list screen in the same process as in steps S1 to S6 of FIG. 7 (refer to FIG. 17 (a)).

In step S47, the safety and health patrol committee member presses the document list button. The operation reception unit 15 of the first terminal device 10 receives the pressing of the document list button.

In step S48, the first communication unit 11 of the first terminal device 10 transmits a request for acquiring a list of task registration information to the information processing system 50. Further, the first communication unit 11 transmits the current location information (an example of third location information) of the first terminal device 10 to the information processing system 50. The location information detection unit 14 detects the current location information immediately before the request for acquiring the list of task registration information or in response to the request from the information processing system 50.

In step S49, the fourth communication unit 51 of the information processing system 50 receives a request for acquiring a list of task registration information. Then, the distance calculation unit 55 calculates the distance between the location information of the first terminal device 10 and the location information associated with the correction request registered in the data storage unit 59. The distance calculation unit 55 may calculate the distance from the location information associated with the improvement report.

In step S50, the information processing system 50 transmits a list of correction requests within a certain distance from the first terminal device 10 as a candidate. The method for determining the correction request within a certain distance may be the same as in FIG. 15. The information processing system 50 may also transmit a list of improvement reports within a certain distance.

In step S51, the first communication unit 11 of the first terminal device 10 receives the list of correction requests, and the display control unit 13 displays the list of correction requests (refer to FIG. 17 (b)).

As described above, the safety and health patrol committee member can check the list of correction requests before creating or posting the correction request by using the document list button and can confirm the correction request posted at the same location. Therefore, the safety and health patrol committee member can confirm in advance whether there is a possibility of duplicating posting. Also, when the safety and health patrol committee member confirms the correction request after posting, it becomes easier to select the correction request posted at that location.

FIG. 17 is a diagram illustrating examples of screens displayed by the first terminal device 10 when the safety and health patrol committee member confirms a list of correction requests.

FIG. 17 (a) is an example of the template list screen. The template list screen may be the same as FIG. 8 (b).

FIG. 17 (b) is an example of the correction request list screen 240. The correction request list screen 240 may be the same as FIG. 12 (b).

When registering the data entered in the improvement report template, instead of the information processing system 50 selecting the correction request candidate based on the current location information of the second terminal device 20, the information processing system 50 may select a correction request based on the location information of the photograph for improvement report.

For example, when registering the improvement report, the network of the second terminal device 20 may be offline (radio waves do not reach, such as underground). The administrator takes only the photograph after the improvement, moves to the place where the network goes online, and registers the improvement report in the information processing system 50. Therefore, even when the second terminal device 20 is offline, the administrator can perform the task of creating the improvement report.

Figure 18:
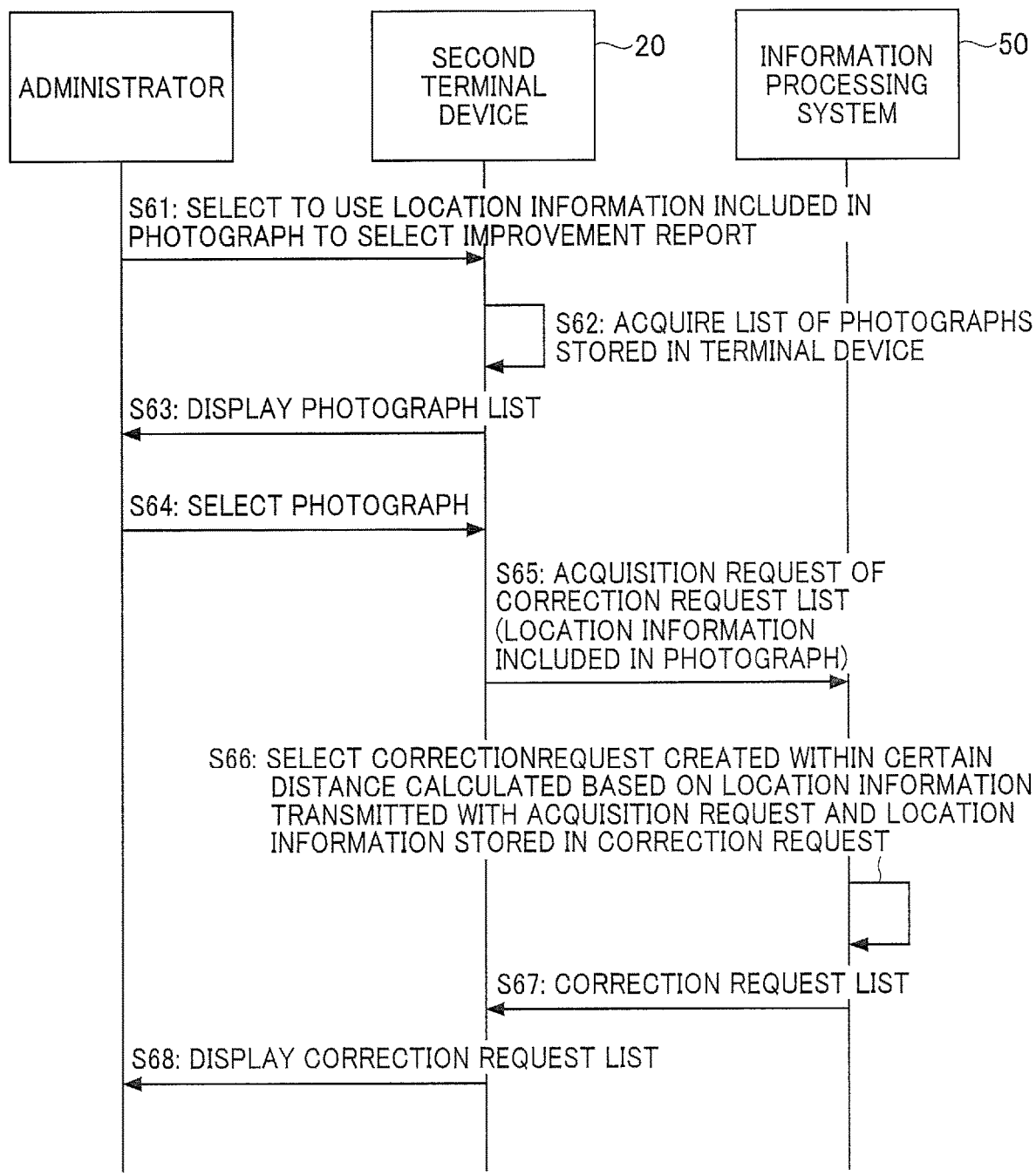
FIG. 18 is a sequence diagram illustrating an example of a process in which a second terminal device registers data input in the improvement report template in the information processing system in response to an operation by the administrator.

FIG. 18 is a sequence diagram illustrating an example of a process in which the second terminal device 20 registers the data input in the improvement report template in the information processing system 50 in response to an operation by the administrator.

Figure 19:
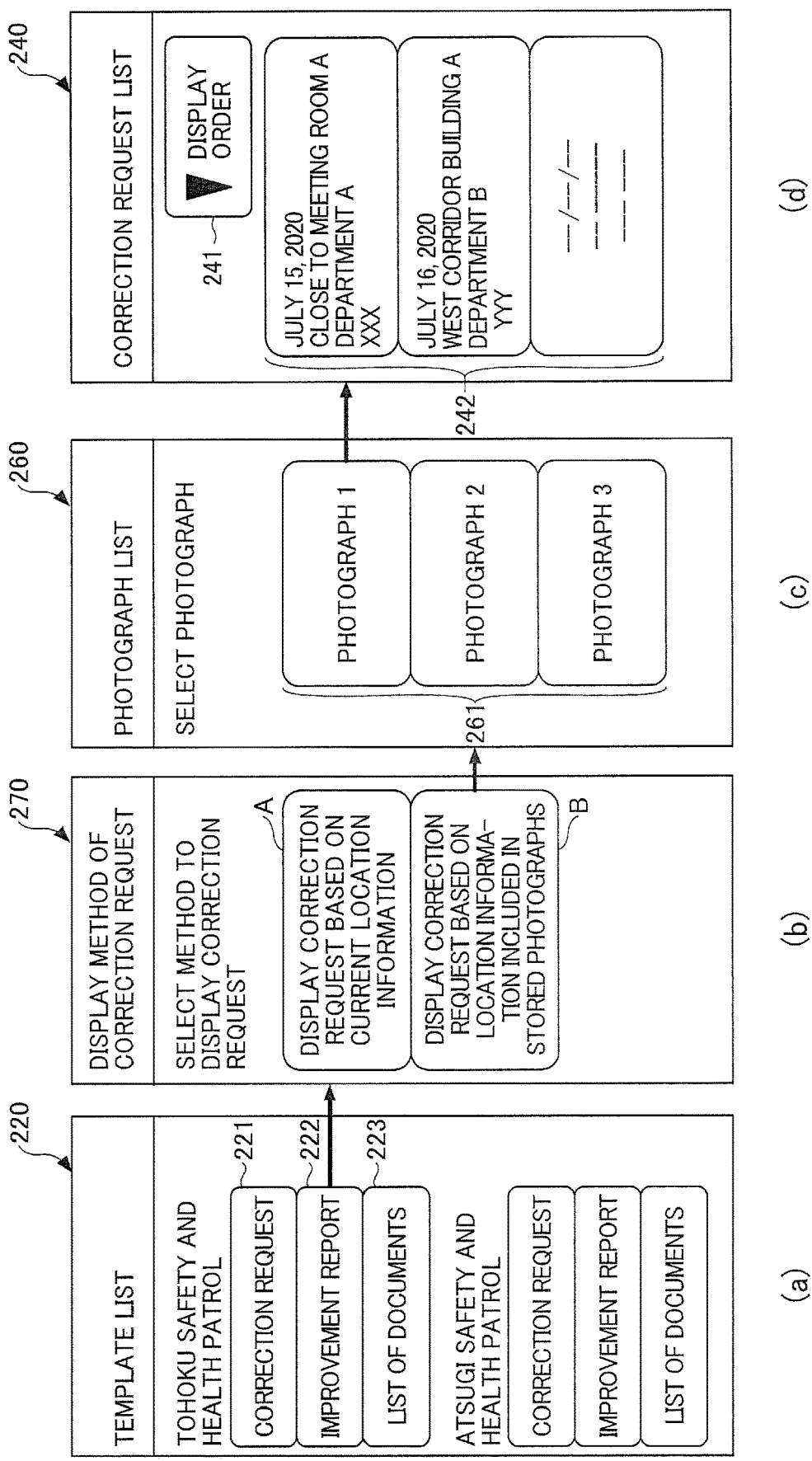
FIG. 19 is a diagram illustrating an example of a screen displayed by the second terminal device.

The second terminal device 20 displays the template list screen in the same process as in steps S1 to S6 of FIG. 7. An example of the template list screen is illustrated in FIG. 19 (a).

In step S61, the administrator selects, for example, the improvement report template from the template list. The operation reception unit 25 receives the administrator's selection. Then the administrator inputs in the display method setting screen whether to select a candidate for an improvement report using the current location information or to select the candidate for the improvement report using the location information included in the photograph (image data). FIG. 19 (b) illustrates an example of the display method setting screen. Here, it is assumed that the administrator has selected a candidate for an improvement report using the location information included in the photograph.

In step S62, the display control unit 23 of the second terminal device 20 acquires a list of photographs (image data) stored in the second terminal device 20.

In step S63, the display control unit 23 displays a photograph list on the display. An example of the photograph list screen is illustrated in FIG. 19 (c).

In step S64, the administrator selects the photograph taken after the improvement. The operation reception unit 25 of the second terminal device 20 receives the selection.

In step S65, the second communication unit 21 of the second terminal device 20 transmits a request for acquiring a list of correction requests and location information at the time of taking a photograph to the information processing system 50. The location information of the photograph may be, for example, the location information stored in Exchangeable Image File Format (EXIF) of the photograph. The location information of the photograph may be acquired immediately before data transmission, during the process of FIG. 19, between immediately before and immediately after taking the photograph, or at a time when a request by the information processing system is received.

In step S66, the fourth communication unit 51 of the information processing system 50 receives the acquisition request of the list of correction requests and the location information at the time of taking the photograph. The distance calculation unit 55 calculates the distance from the location information at the time of taking the photograph and the location information associated with the correction request of the data storage unit 59. The user may be able to change the distance used in this determination.

In step S67, the data reception unit 53 transmits the list of correction requests within a certain distance to the second terminal device 20 through the fourth communication unit 51 as a candidate.

In step S68, the second communication unit 21 of the second terminal device 20 receives the list of correction requests, and the display control unit 23 displays the list of correction requests on the display. FIG. 19 (*d*) illustrates the correction request list screen 240. Subsequent processing may be the same as step S26 and after in FIG. 11.

As described above, even when the second terminal device 20 is offline, the administrator can perform the task of creating the improvement report.

Further, in the sequence diagram of FIG. 11, when the location information at the time of taking the photograph and at the time of transmitting the improvement report are different, the candidate for the correction request is not displayed based on the location information at the time of taking the photograph, but in the process of FIG. 18, candidates for correction requests can be displayed based on the location information at the time of taking the photograph.

The combination of the two location information when the information processing system 50 calculates the distance based on the location information of the first terminal device 10 and the location information of the second terminal device 20 may be arbitrary. Specifically, the location information of the first terminal device 10 and the location information of the second terminal device 20 may be any combination of the current location information or the location information included in the photograph.

FIG. 19 illustrates examples of screens displayed by the second terminal device 20. FIG. 19 (*a*) may be the same as FIG. 8 (*b*).

FIG. 19 (*b*) is an example of a display method setting screen 270 for the correction request list. The display method setting screen 270 includes a button A and a button B. The button A is a button for the user to select a display method in which the second terminal device 20 displays the list of correction requests based on the current location information. The button B is a button for the user to select the display method in which the second terminal device 20 displays the list of correction requests based on the location information of the photograph.

An example of a photograph list screen 260 is illustrated in FIG. 19 (*c*). The photograph list screen 260 displays a list of photographs (image data) 261 stored in the second terminal device 20. Each photograph can be selected.

An example of a correction request list screen 240 is illustrated in FIG. 19 (*d*). FIG. 19 (*d*) is the same as FIG. 12 (*b*) but displays the list of correction requests selected based on the location information of the photograph selected in FIG. 19 (*c*).

In FIG. 19, after the improvement report template is selected, the second terminal device 20 allows the user to select the method for displaying the list of correction requests. Alternatively, the user may set the method of displaying the list of correction requests on the setting screen or the like in advance. In the latter case, since the display method setting screen 270 of FIG. 19 (*b*) is not displayed, the workload of the user is reduced.

The present embodiment can also be applied, for example, at a production site. At the production site, calls are made daily from members working at the production site. A leader in the production site responsible for supporting the members cannot concentrate on their work due to a large number of calls. In addition, it takes time to respond.

By changing a buzzer for the members to call the leader into a smartphone and applying the process of the present embodiment, it is possible to shorten the time for the leader and the like to respond to the call at the production site and improve efficiency.

Figure 20:
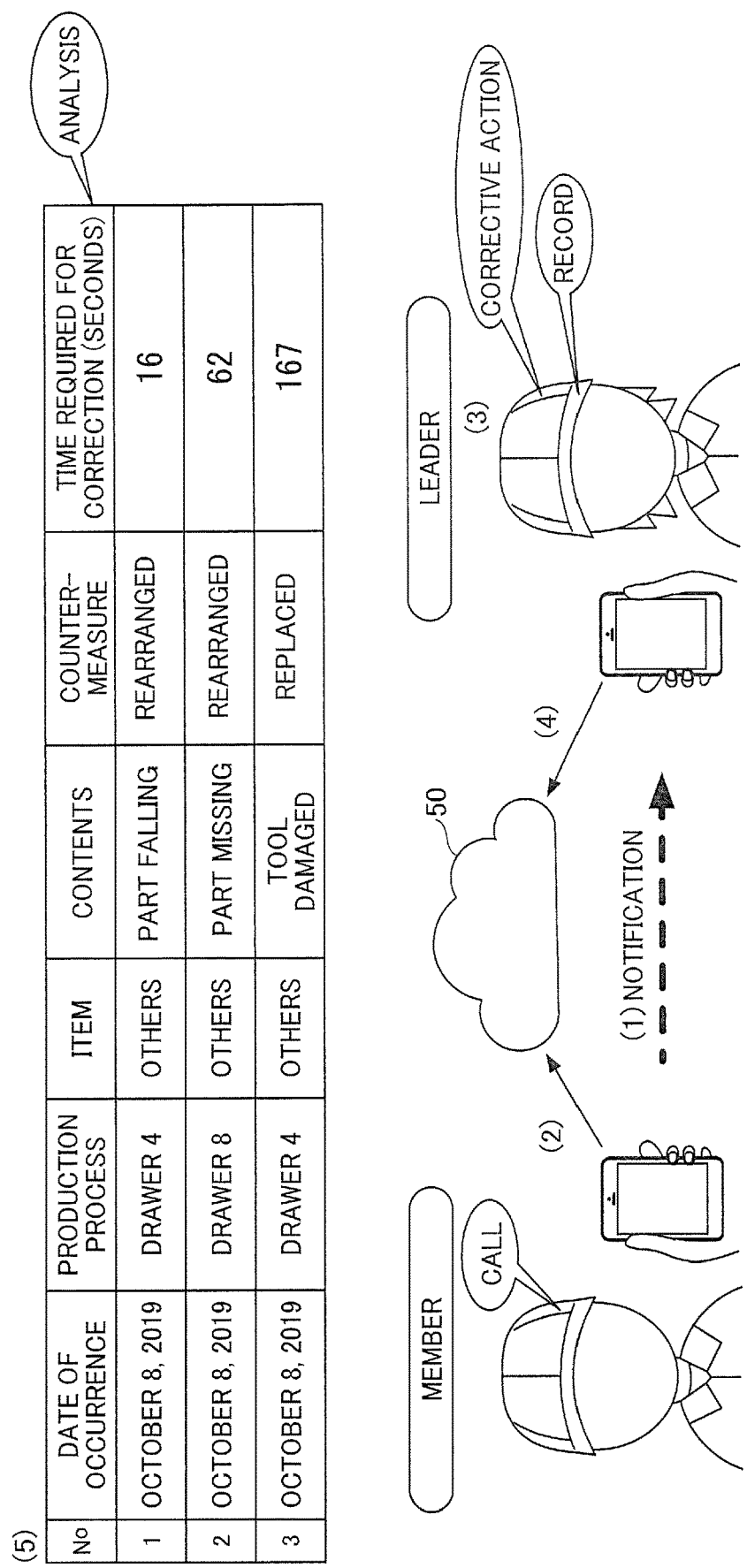
FIG. 20 is a diagram illustrating an application example of the present embodiment at a production site.

FIG. 20 is a diagram illustrating an application example of the present embodiment at the production site. The information processing system is associated with a call task that the member inputs when calling the leader and a countermeasure task that is input when the leader implements a countermeasure to the call. In addition, the input items of the call task are registered in the call template, and the input items of the countermeasure task are registered in the countermeasure template.

(1) The member operates the application of the terminal device to notify the leader. As a method for the member to notify the leader, a push notification through the server is available. The push notification indicates that when something changes or needs to be notified by the application etc., the application automatically notifies by display or sound. A brief description of the push notification is given below.

a. A device token which is an identifier (ID) is given to the application running on the terminal devices of the member and the leader by a distribution source of the application.

b. The distribution server managed by an operating system (OS) manufacturer of the terminal devices of the member and the leader manages the correspondence table of the device token and the individual identification number of the terminal devices (or OS) of the member and the leader.

c. The information processing system 50 stores the device token of the application in association with the user IDs of the logged-in member and the leader.

d. In response to receiving the notification from the member, the information processing system 50 identifies the leader of an organization to which the member belongs by referring to a personnel management table or the like. In order to send the push notification to the leader, the information processing system 50 specifies the device token associated with the user ID of the leader, and a message (for example, the fact that the call is being made and the identification information of the notification (information that identifies the call)) and request the delivery server to deliver the push notification.

e. The distribution server that received the request distributes the push notification to the individual identification number associated with the specified device token.

The method of delivering the push notification may differ depending on the OS manufacturer, and the above description is only an example.

(2) Further, the application of the terminal device of the member receives the identification information (information for identifying the call) of the notification from the information processing system 50 in response to transmitting the notification to the information processing system 50. The member operates the application of the terminal device and inputs the call contents into the call template. The terminal device application operated by the member transmits the data input to the call template to the information processing system 50. The information processing system 50 stores data in association with the identification information of the notification.

(3) The leader confirms the call by notification and implements a countermeasure. It is not always necessary to go to the member.

(4) When the countermeasure is implemented the leader operates the application of the terminal device and inputs the countermeasure contents in the countermeasure template. The application of the terminal device transmits the data input in the countermeasure template to the information processing system 50 by designating the identification information of the notification.

(5) The information processing system 50 stores the data input in the call template and the data input in the countermeasure template in association with each other based on the identification information of the notification.

With such a configuration, the call can be answered immediately wherever the leader is. Further, in the configuration of FIG. 20, since the call and the countermeasure are stored on the cloud, aggregation and the like can be easily performed. Further, the configuration of FIG. 20 can reduce the cost of installing the buzzer in the production site.

As described above, the information processing system 50 of the present embodiment can set a plurality of tasks in one task registration information. The application displays buttons corresponding to each of the plurality of tasks set in a piece of the task registration information. Safety and health patrol committee members and administrators can easily select the button according to the task.

Further, since the information processing system 50 stores the data input to a template together with the location information, it is possible to provide a list of correction requests based on the location information of the second terminal device 20 operated by the administrator. The usability of the administrator who generates improvement report in response to the correction request at the site is improved. Further, since the information processing system 50 can manage the data input by different users in association with each other, it becomes easy to manage the task.

For example, in the present embodiment, two tasks, the correction request and the improvement report, are registered in the task registration information, but the tasks registered in the task registration information are not limited to these two tasks.

Further, in the present embodiment, a native application is executed on the terminal device, but the web application may be executed. In this case, the input items are defined by HTML, or JAVASCRIPT (registered trademark).

Configuration examples such as FIG. 5 are divided according to main functions in order to facilitate understanding of processing by the first terminal device 10, the second terminal device 20, the third terminal device 30, and the information processing system 50. The present disclosure is not limited by the way of dividing the processing unit or the name. The processing of the first terminal device 10, the second terminal device 20, the third terminal device 30, and the information processing system 50 can be divided into more processing units according to the processing content. Further, one processing unit can be divided so as to include more processing.

The apparatuses described in the examples are merely an illustration of one of several computing environments for implementing the embodiments disclosed herein. In some embodiments, the information processing system 50 includes multiple computing devices, such as a server cluster. The plurality of computing devices is configured to communicate with one another through any type of communication link, including a network, shared memory, etc., and perform the processes disclosed herein.

Further, the information processing system 50 may be configured to share the disclosed processing steps, for example, FIG. 7 in various combinations. For example, a process executed by a given unit may be executed by a plurality of information processing apparatuses included in the information processing system 50. Further, the information processing system 50 may be integrated into one server device or may be divided into a plurality of devices.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A data management system comprising one or more terminal devices, an administrator terminal device, and an information processing system, the information processing system comprising circuitry configured to:

transmit a template creation screen to the administrator terminal device, the template creation screen configured to receive inputs of template setting information including a template name, task names of a plurality of tasks, and input items set for each task and input by a user, the plurality of tasks including at least a request task and a reporting task;

create a template based on the template setting information input through the template creation screen, the template including the plurality of tasks;

store the template in one or more memories; and transmit the template to the one or more terminal devices, and each of the one or more terminal devices comprising circuitry configured to:

display on a display, the plurality of tasks included in the template;

receive a selection of a task from the plurality of tasks displayed on the display; and display on the display, the input items set for the selected task.

2. The data management system of claim 1, wherein
the circuitry of the each of the one or more terminal devices is further configured to:

request the information processing system for the template, wherein the circuitry displays on the display the input items based on the template that is received from the information processing system.

3. The data management system of claim 2, wherein the one or more terminal devices include a first terminal device and a second terminal device different from the first terminal device, the circuitry of the information processing system is further configured to store in the one or more memories, data input to the input items of a first task of the plurality of associated tasks at the first terminal device and data input to the input items of a second task at the second terminal device in association with each other.

4. The data management system of claim 3, wherein the circuitry of the first terminal device is configured to:
transmit the data input to the input items of the first task and first location information of the first terminal device to the information processing system; and
the circuitry of the information processing system is further configured to:
store in the one or more memories, the data input to the input items of the first task in association with the first location information;
transmit to the second terminal device a list of candidates of the first task determined based on second location information transmitted from the second terminal device and the first location information; and
the circuitry of the second terminal device is configured to:
display on the display the list of the candidates of the first task.

5. The data management system of claim 4, wherein the first location information is location information of the first terminal device immediately before transmitting the data input to the input items of the first task to the information processing system; and
the second location information is location information of the second terminal device immediately before the second terminal device transmits the data input to the input items of the second task to the information processing system.

6. The data management system of claim 4, wherein the first location information is location information of the first terminal device immediately before transmitting the data input to the input items of the first task to the information processing system; and
the second location information is location information included in a photograph taken by a user of the second terminal device according to the input items of the second task.

7. The data management system of claim 4, wherein the first location information is location information included in a photograph taken by a user of the first terminal device according to the input items of the first task; and
the second location information is location information included in the photograph taken by the user of the second terminal device according to the input items of the second task.

8. The data management system of claim 4, wherein the circuitry of the second terminal device is further configured to:
receive a selection of the first task from the list of the candidates of the first task; and
transmit the selected first task to the information processing system, and
the circuitry of the information processing system is further configured to:
store in the one or more memories, the data input to the input items of the first task transmitted from the second terminal device of the plurality of associated tasks and the data input to the input items of the second task in the second terminal device in association with each other.

9. The data management system of claim 3, wherein the circuitry of the first terminal device is further configured to:
transmit the data input to the input items of the first task and first location information of the first terminal device to the information processing system, and
the circuitry of the information processing system is further configured to:
store in the one or more memories, the data input to the input items of the first task and the first location information in association with each other;
transmit to the first terminal device, a list of candidates of the first task determined based on third location information transmitted from the first terminal device and the first location information; and
the circuitry of the first terminal device is further configured to display on a display, the list of the candidates of the first task.

10. A terminal device configured to communicate with an administrator terminal device and an information processing system configured to transmit a template creation screen to the administrator terminal device, the template creation screen configured to receive inputs of template setting information including a template name, task names of a plurality of tasks, and input items set for each task and input by a user, the plurality of tasks including at least a request task and a reporting task, the information processing system further configured to create a template based on the template setting information input through the template creation screen, the template including the plurality of tasks, and store the template, the terminal device comprising circuitry configured to:
display on a display, the plurality of tasks included in the template received from the information processing system;
receive a selection of a task from the plurality of tasks displayed on the display; and
display on the display, the input items set for the selected task.

11. A data input method executed by a terminal device, an administrator terminal device, and an information processing system, the method comprising:
transmitting a template creation screen by the information processing system to the administrator terminal device, the template creation screen configured to receive inputs of template setting information including a template name, task names of a plurality of tasks, and input items set for each task and input by a user, the plurality of tasks including at least a request task and a reporting task;
creating a template based on the template setting information input through the template creation screen, the template including the plurality of tasks;
storing the template in one or more memories;
displaying on a display of the terminal device, the plurality of tasks included in the template received from the information processing system;
receiving a selection of a task from the plurality of tasks displayed on the display; and
displaying on the display of the terminal device, the input items set for the selected task.

\* \* \* \* \*